(12) United States Patent
Kawamata et al.

(10) Patent No.: US 7,176,813 B2
(45) Date of Patent: Feb. 13, 2007

(54) SYSTEM AND METHOD FOR PROCESSING AND DISPLAYING TRAFFIC INFORMATION IN AN AUTOMOTIVE NAVIGATION SYSTEM

(75) Inventors: Yukihiro Kawamata, Novi, MI (US); Deepak Ramaswamy, Farmington, MI (US); Kunihiko Kurami, Ann Arbor, MI (US)

(73) Assignee: Xanavi Informatics Corporation, Kanagawa-Ken (JP)

( * ) Notice: Subject to any disclaimer, the term of this patent is extended or adjusted under 35 U.S.C. 154(b) by 230 days.

(21) Appl. No.: 10/938,813

(22) Filed: Sep. 10, 2004

(65) Prior Publication Data
US 2006/0055565 A1    Mar. 16, 2006

(51) Int. Cl.
G08G 1/123    (2006.01)

(52) U.S. Cl. ............. 340/995.13; 340/905; 701/117; 701/200

(58) Field of Classification Search ............ 340/995.13
See application file for complete search history.

(56) References Cited

U.S. PATENT DOCUMENTS

| | | | |
|---|---|---|---|
| 5,428,545 A * | 6/1995 | Maegawa et al. ............ 701/210 |
| 6,161,072 A | 12/2000 | Clapper ........................ 701/93 |
| 6,282,486 B1 * | 8/2001 | Bates et al. ................. 340/992 |
| 6,314,367 B1 * | 11/2001 | Ohler et al. ............. 340/995.1 |
| 6,456,931 B1 | 9/2002 | Polidi et al. ................. 701/208 |
| 6,480,783 B1 | 11/2002 | Myr ........................... 701/117 |
| 6,490,519 B1 * | 12/2002 | Lapidot et al. ............. 340/905 |
| 6,587,785 B2 | 7/2003 | Jijina et al. ................. 701/210 |
| 6,590,507 B2 | 7/2003 | Burns ..................... 340/995.13 |
| 6,615,130 B2 | 9/2003 | Myr ........................... 701/117 |
| 6,622,087 B2 | 9/2003 | Anderson ................... 701/209 |
| 6,690,292 B1 | 2/2004 | Meadows et al. ........... 340/905 |
| 6,720,920 B2 | 4/2004 | Breed et al. ................. 342/386 |
| 6,862,524 B1 * | 3/2005 | Nagda et al. ........... 340/995.13 |
| 6,895,324 B2 * | 5/2005 | Straub ........................ 340/905 |
| 6,911,918 B2 * | 6/2005 | Chen .......................... 340/905 |
| 6,950,745 B2 * | 9/2005 | Agnew et al. .............. 701/210 |

(Continued)

FOREIGN PATENT DOCUMENTS

JP    8044997    2/1996

(Continued)

Primary Examiner—Daniel Wu
Assistant Examiner—Eric M. Blount
(74) Attorney, Agent, or Firm—Gifford, Krass, Groh, Sprinkle, Anderson & Citkowski, P.C.

(57) ABSTRACT

A system and method for displaying traffic information in an automotive navigation system having a display, memory and a data receiver. The method includes the first step of storing in a traffic speed table in memory at least two speed threshold limits wherein each speed threshold limit represents a different traffic flow category. The receiver receives data representative of the vehicle speed on at least one road segment and compares that received vehicle speed data with the traffic speed table to determine the traffic flow category corresponding to the received speed data for the road segment. A visual indicator is then displayed on the display which corresponds to the traffic flow category for the road segment. The user is able to customize the speed threshold limits through a GUI. These speed threshold limits are further user modifiable as a function of weather, day of the week, road conditions, type of road, as well as other factors.

36 Claims, 25 Drawing Sheets

U.S. PATENT DOCUMENTS

| | | | |
|---|---|---|---|
| 6,973,319 B2 * | 12/2005 | Ormson | 340/995.13 |
| 7,050,903 B1 * | 5/2006 | Shutter et al. | 340/995.13 |
| 2003/0093209 A1 | 5/2003 | Andersson et al. | 701/93 |
| 2003/0187573 A1 | 10/2003 | Agnew et al. | 701/201 |
| 2003/0191568 A1 | 10/2003 | Breed | 701/36 |
| 2004/0068364 A1 | 4/2004 | Zhao et al. | 701/201 |
| 2004/0254698 A1 * | 12/2004 | Hubbard et al. | 701/35 |
| 2005/0093720 A1 * | 5/2005 | Yamane et al. | 340/995.13 |
| 2005/0288856 A1 * | 12/2005 | Uyeki et al. | 340/995.21 |

FOREIGN PATENT DOCUMENTS

| | | |
|---|---|---|
| JP | 2002090156 | 3/2002 |
| JP | 2002340584 | 11/2002 |

* cited by examiner

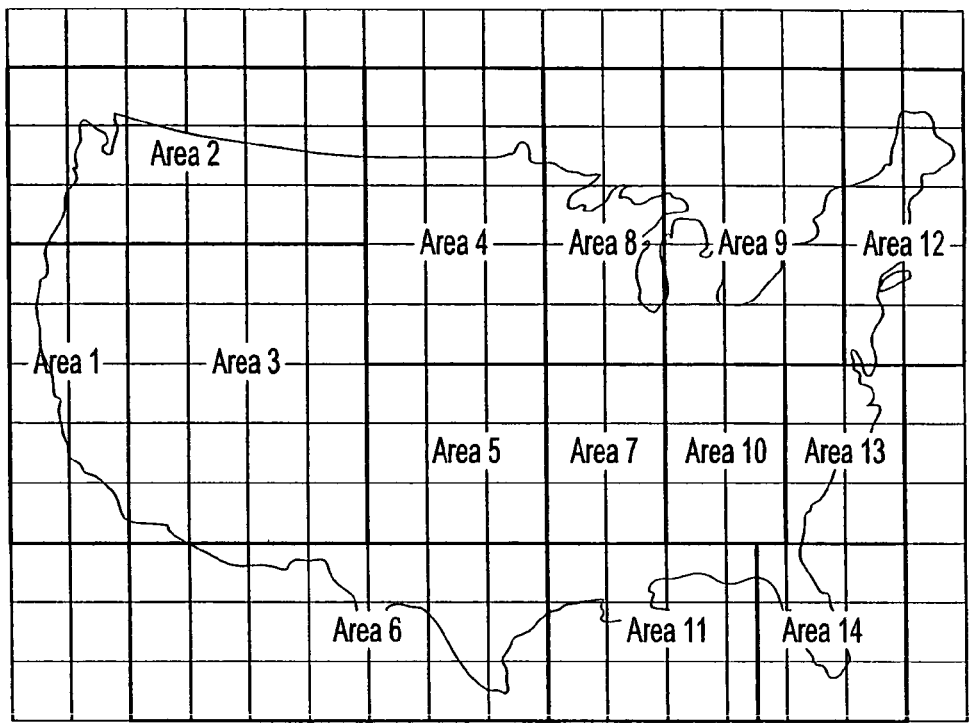

Fig-2

| | Smooth Traffic | Light Congestion | Heavy Congestion |
|---|---|---|---|
| Area1 | 45mph over | 35mph - 45mph | less than 35mph |
| Area2 | 50mph over | 40mph - 50mph | less than 40mph |
| Area3 | 60mph over | 40mph - 60mph | less than 40mph |
| Area4 | 60mph over | 40mph - 60mph | less than 40mph |
| Area5 | 60mph over | 40mph - 60mph | less than 40mph |
| Area6 | 60mph over | 40mph - 60mph | less than 40mph |
| Area7 | 60mph over | 50mph - 60mph | less than 50mph | ← Proposed feature
| Area8 | 50mph over | 40mph - 50mph | less than 40mph |
| Area9 | 70mph over | 50mph - 70mph | less than 50mph |
| Area10 | 60mph over | 40mph - 60mph | less than 40mph |
| Area11 | 60mph over | 40mph - 60mph | less than 40mph |
| Area12 | 50mph over | 35mph - 50mph | less than 35mph |
| Area13 | 50mph over | 35mph - 50mph | less than 35mph |
| Area14 | 60mph over | 40mph - 60mph | less than 40mph |

Fig-3

| Link ID |
|---------|
| 105 |
| 106 |
| 107 |
| 120 |
| 121 |
| 122 |
| ⋮ |
| 206 |

Fig-25

Set the Priority of raffic Event — 193

| | Lowest | | Normal | | Highest |
|---|---|---|---|---|---|
| Road Work | ○ | ○ | ○ | ○ | ● |
| Traffic Congestion | ○ | ○ | ● | ○ | ○ |
| Accident | ○ | ○ | ● | ○ | ○ |
| Bad Weather | ○ | ○ | ● | ○ | ○ |

Set the Priority of Traffic Event — 193

| | Lowest | | Normal | | Highest |
|---|---|---|---|---|---|
| Road Work | ○ | ○ | ● | ○ | ○ |
| Traffic Congestion | ○ | ○ | ● | ○ | ○ |
| Accident | ○ | ○ | ● | ○ | ○ |
| Bad Weather | ○ | ○ | ● | ○ | ○ |

OK    NO

| Weather Condition | Smooth Traffic | Light Congestion | Heavy Congestion |
|---|---|---|---|
| Sunny | 60mph over | 40mph - 60mph | less than 40mph |
| Rain (Slippery) | 40mph over | 30mph - 40mph | less than 30mph |
| Snow (Slippery) | 35mph over | 20mph - 35mph | less than 20mph |
| Fog (Invisible) | 40mph over | 20mph - 35mph | less than 20mph |

Sunny Day

Rainy Day

| Day of the week | Smooth Traffic | Light Congestion | Heavy Congestion |
|---|---|---|---|
| Monday | 55mph over | 30mph - 55mph | less than 30mph |
| Tuesday | 55mph over | 30mph - 55mph | less than 30mph |
| Wednesday | 55mph over | 30mph - 55mph | less than 30mph |
| Thursday | 55mph over | 30mph - 55mph | less than 30mph |
| Friday | 55mph over | 30mph - 55mph | less than 30mph |
| Saturday | 60mph over | 40mph - 60mph | less than 40mph |
| Sunday | 60mph over | 40mph - 60mph | less than 40mph |

*Fig-34*

```
Receive the Traffic Information Data                        — 250
              ↓
Extract Area Code, Location Code, Event Code
and Direction Code in the Receiving Data                    — 252
              ↓
Look Up the Threshold of the Area Code
From the Day Threshold Table                                — 259
              ↓
Look Up the Event of the Event Code
From the Event Table                                        — 256
              ↓
Comparison With the Threshold                               — 258
              ↓
Traffic Speed Fflow Display                                 — 260
```

*Fig-35*

Monday, Tuesday, Wednesday, Thursday, Friday

Saturday, Sunday

| Event Code | Event |
|---|---|
| Event Code 2 | Event 1 ("Congestion 10mph") |
| Event Code 3 | Event 2 ("Congestion 20mph") |
| Event Code 4 | Event 3 ("Congestion 25mph") |
| Event Code 5 | Event 4 ("Congestion 35mph") |
| Event Code 6 | Event 6 ("Congestion 50mph") |
| Event Code 7 | Event 7 ("Congestion 60mph") |
| ⋮ | ⋮ |
| Event Code N | Event N ("Road Works",) |

*Fig-41*

SYSTEM AND METHOD FOR PROCESSING AND DISPLAYING TRAFFIC INFORMATION IN AN AUTOMOTIVE NAVIGATION SYSTEM

BACKGROUND OF THE INVENTION

I. Field of the Invention

The present invention relates generally to automotive navigation systems and, more particularly, to a method for displaying traffic information in an automotive navigation system.

II. Description of Related Art

Automotive navigation systems have become increasingly prevalent in automotive vehicles. Such navigation systems typically include a display screen mounted in the vehicle in a position visible to the driver. Conventionally, such automotive navigation systems display a road map on the screen and, by using GPS to determine the position of the vehicle, also display the position of the vehicle on the screen.

Many roads, and certainly most major roads, include traffic sensors which detect the average vehicle speed at the position of the sensor on its given road as well as traffic events which potentially affect traffic flow. These traffic sensors transmit this traffic flow data to a central station. The central station, after combining the received signals from the various traffic flow sensors across the country, transmits the combined traffic flow data to a geographic area. For example, in the United States, traffic flow data for the contiguous 48 states is continuously transmitted by satellite.

There have been previously known navigation systems having receivers which receive the traffic flow data transmitted by satellite. These previously known navigation systems then compare the traffic flow data for the various road segments displayed on the navigation system display screen with preset speed limits corresponding to predetermined traffic flow conditions. For example, these previously known navigation systems may designate average vehicle speeds in excess of 55 miles per hour to constitute light traffic, traffic speeds between 30 miles per hour and 55 miles per hour to constitute light congestion, and all traffic speeds less than 30 miles per hour to constitute a congested traffic condition. The navigation system then generates the appropriate display on the display, e.g. by using different colors to represent different traffic flow conditions.

These previously known navigation systems having traffic flow display capabilities, however, all suffer from a number of common disadvantages. One disadvantage is that these previously known navigation systems fail to accommodate different drivers with different driving habits. For example, while one driver may consider a speed of 40 miles per hour to constitute a traffic flow with light congestion, a different driver with different driving habits may consider such a traffic flow condition to constitute a highly congested traffic flow condition. Still a third driver may consider such a speed to constitute a smooth traffic flow condition.

Similarly, these previously known navigation systems with traffic indication capability all fail to take into account traffic flow conditions which vary as a function of other driving conditions. For example, the geographic area in which a particular vehicle is driven, the weather conditions, day of the week, road type, as well as other factors, all impact on the traffic flow conditions. Because of this, the previously known navigation systems with traffic flow indicators have provided inadequate information to the driver of the vehicle for the driver of the vehicle to determine the actual traffic flow conditions for one or more road segments.

A still further disadvantage of these previously known navigation systems with traffic flow indication capability is that such systems are limited strictly to a display of the relative traffic congestion along the various road segments displayed on the display device. These systems, however, are unable to display other data to the driver in order to enable the driver to assess the actual road conditions. For example, various traffic events, such as a flooded road, road work, and the like, may greatly impact upon the road conditions and, correspondingly, the selected route by the driver. Still other information, such as information that the navigation system is currently receiving data from the satellite transmission and that the information displayed on the display screen is current, also impacts upon the route selection of the driver. These previously known systems, however, do not display such information.

SUMMARY OF THE PRESENT INVENTION

The present invention provides a navigation system having traffic flow display capability which overcomes all of the above-mentioned disadvantages of the previously known devices.

In brief, the system and method of the present invention is for use with an automotive navigation system having a visual display, memory and a data receiver. The method comprises the step of first storing in a traffic speed table in the memory at least two speed threshold limits wherein each speed threshold limit corresponds to a different traffic flow category. Preferably, these speed threshold limits are set by the user through a GUI (graphic user interface) which enables the user to select his or her own threshold limits for the various traffic flow categories.

The receiver then receives data representative of the traffic flow conditions on at least one road segment displayed on the display device. After receipt of the data, the received vehicle speed data for the various road segments is compared with the traffic speed table to determine the traffic flow category corresponding to the received vehicle speed data. Thereafter, a visual indicator is displayed on the display which corresponds to the traffic flow category for the various road segments. For example, road segments in which there is smooth traffic may be displayed in the color green, road segments for light traffic congestion would be displayed in the color yellow, while the road segments having heavy traffic congestion would be displayed in the color red.

In the preferred embodiment of the invention, the system and method preprocesses the traffic flow data to eliminate redundant data, as well as data that is unchanged from the prior data reception. Additionally, the data is preprocessed to eliminate obvious data reception errors, e.g. by comparing the received data with preset ranges of acceptable data.

The speed threshold limits stored in the traffic speed table are also user modifiable, preferably by using a GUI, to accommodate for other traffic conditions such as weather conditions, the day of the week, the geographical area of the road segments, the road type, as well as other factors. These speed threshold limits may all be modified and set by the user.

The method of the present invention also displays other data on the display screen which pertains to traffic congestion and enables optimal route selection by the driver. In particular, the present invention displays various traffic events along road segments between the current position of the vehicle and a destination position. Such road events would include, for example, "road work", "road flooded" as well as other traffic events which affect traffic flow.

The present method also provides a visual indication to the driver of whether or not the displayed information on the navigation system display screen is current or not. The present method achieves this by displaying an indication whenever it is receiving data or is not receiving data from the satellite transmission. An indicator is also provided on the display screen whenever the data is currently being updated.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 2 is a view illustrating a geographic division of areas;

FIG. 3 is an exemplary speed threshold table based upon geographic areas;

FIGS. 25–27 are all exemplary GUIs for setting the priority for traffic events;

FIG. 28 is an exemplary weather condition table;

FIG. 34 is an exemplary day of the week speed threshold table;

FIG. 35 is an exemplary flowchart illustrating the operation of one preferred embodiment of the invention;

FIG. 41 is an exemplary event code table; and

DETAILED DESCRIPTION OF A PREFERRED EMBODIMENT OF THE PRESENT INVENTION

Figure 1:
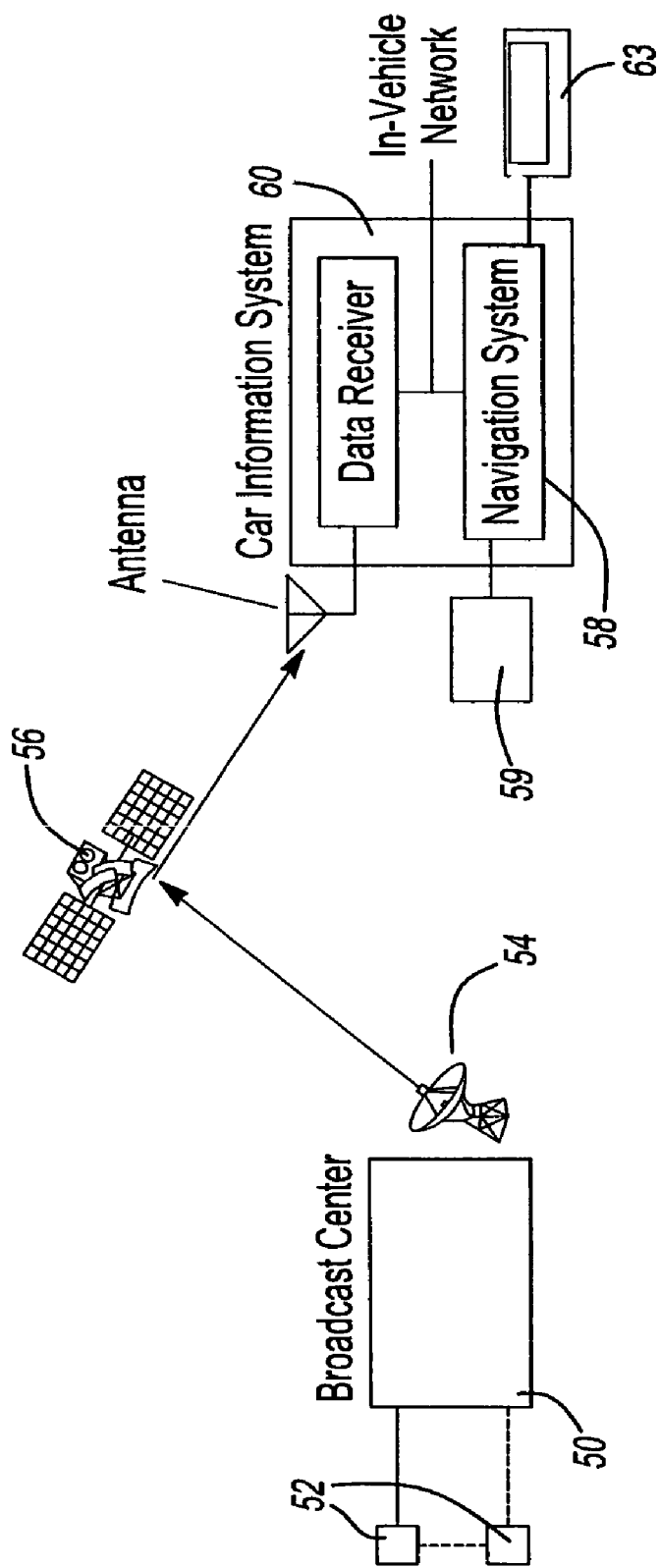
FIG. 1 is a block diagrammatic view illustrating a preferred embodiment of the present invention.

With reference first to FIG. 1, the method of the present invention is for use with a traffic information collection system having a central station 50 which collects data across a geographical area, such as the United States, from a plurality of traffic flow sensors 52. Other data collecting devices and sources can include traffic cameras, traffic information collected by police or highway departments, website sentry collected information, speed sensors located in cars and transmitted to a central server, speed calculations made from car position information, as well as any other source indicative of traffic flow conditions. The central station 50 then collates the inputted data from the sensors 52 and transmits via a transmitting antenna 54 the collated data to a satellite 56. This satellite 56 then transmits the collated data back to the earth where it is received by a data receiver 60 for a navigation system 58 having a display screen 63 and memory 59. For example, the satellite transmission data may use the format and protocols of ISO 14819 entitled Traffic and Traveler Information (TTI).

In the well known fashion, the traffic flow information collected by the central station 50 and transmitted via the satellite 56 to the in-vehicle navigation system 58 transmits an event code corresponding to traffic flow conditions and other traffic events for the various road segments within its geographical area. The information transmitted by the central station also includes information relating to various traffic events, such as road work, flooded roads, etc. The transmitted information may also include other data, such as weather conditions, which pertain to traffic flow. A partial exemplary traffic flow event code table is illustrated in FIG. 41.

Figure 42:
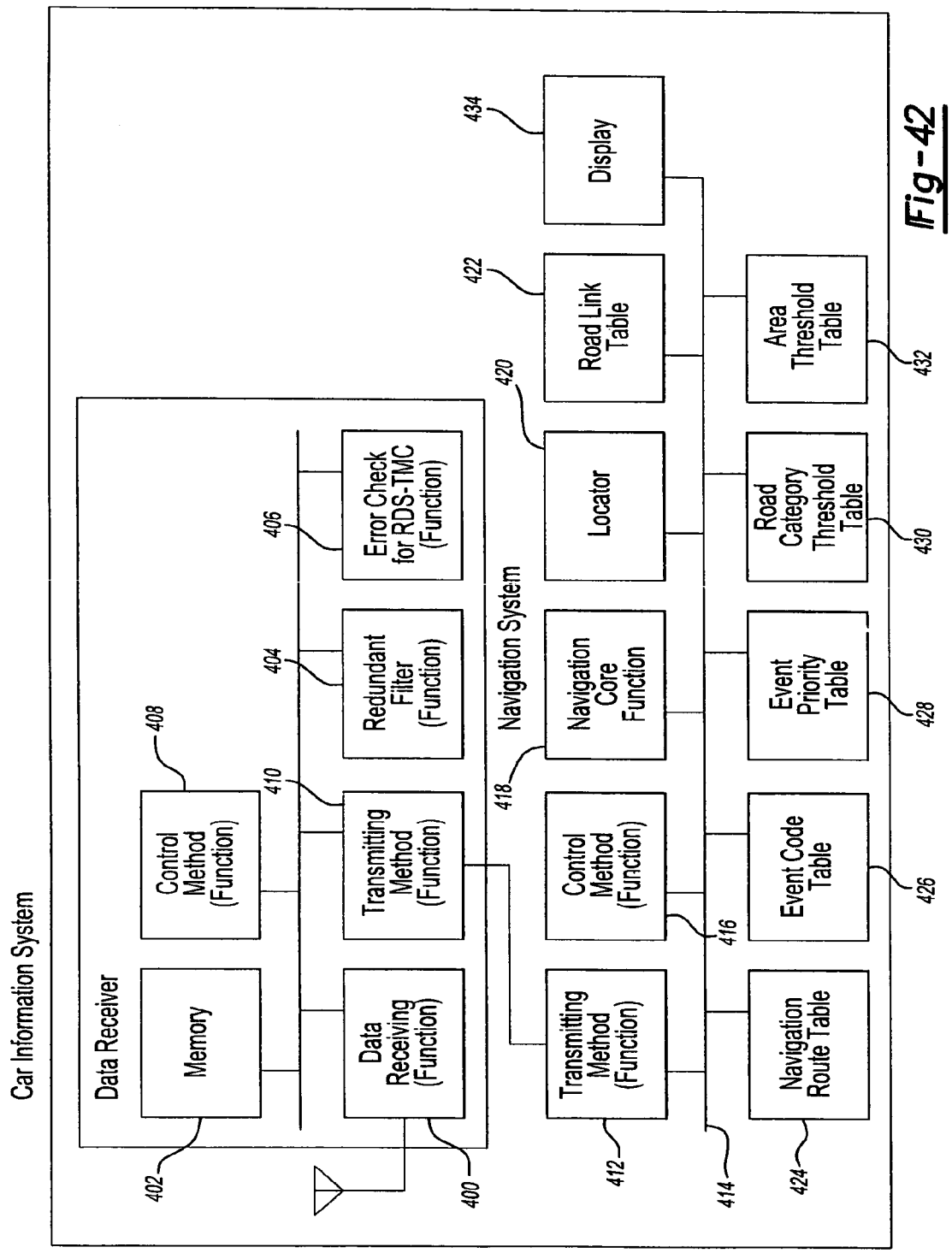
FIG. 42 is a block diagrammatic view of the preferred embodiment of the invention.

With reference now to FIG. 42, a block diagrammatic view of the preferred embodiment of the invention is shown. A data receiver 400 receives the raw data from the transmitting source and communicates this raw data to the upper levels for processing by the system. A memory block 402 serves as a temporary cache for storing the incoming data and acts as a buffer between the input and output stages and the processing stages of the system.

Still referring to FIG. 42, a redundant filter 404 checks the data received by the data receiver 400 and eliminates both redundant data and data that has been unchanged since the prior reception. The operation of the redundant filter 404 will be subsequently described in greater detail. Additionally, an error check function 406 communicates with the data receiver 400 and checks the incoming data received by the data receiver 400 for data integrity. Data received by the data receiver 400 that contains errors are discarded by the error check function 406 in a fashion to be subsequently described in greater detail.

A control method 408 communicates with the overall data processing system and controls the method in which the data is processed by the other components of the system. The control method 408, in particular, communicates with a transmitting method 410 which determines the manner in which the received data is forwarded to the navigation system after the data receiver 400 has stored the incoming data in its memory cache 402.

After processing by the data receiver, the transmitting method forwards the preprocessed data to a transmitting method 412 contained in the navigation system. The transmitting method communicates with the other components of the navigation system 412 through a bus 414.

The navigation system further includes a control method 416 which controls all of the processes performed by the navigation system. These include a navigation core function 418 which has route calculation ability and route guidance capability, as well as a digitized data map.

A locator 420 also communicates with the bus 414 and provides information to the other components of the navigation system of the current position of the vehicle. The locator preferably processes a GPS system, or equivalent, to determine the position of the vehicle.

A road link table 422 also communicates with the data bus 414 and provides a link table defining the road categories for each type of road segment defined in the road link table.

A navigation route table 424 also communicates to the other components of the navigation system through the bus 414. The navigation route table 424 contains a table of the road links from the road link table 422 corresponding to a particular navigation route for the vehicle. This navigation route may be initially selected by the user specifying a destination location, or otherwise.

An event code table 426 contains text information corresponding to various predefined event codes. As will be hereinafter described in greater detail, various event codes, after decoding by the event code table 426, are displayed as information for the user.

An event priority table 428 also communicates through the bus port 14 to the other components of the navigation system. The event priority cable contains both predefined as well as user defined and/or user modifiable priority status of the various different events of the type stored in the event code table 426. In a fashion to be subsequently described in greater detail, the navigation system determines which, if any, event to display for the user as a function of the event priority table 428.

A road category threshold table 430 also communicates to the other components of the navigation system through the bus 414. The road category threshold table defines the speed thresholds for each road category and enables the user to use traffic congestion information. The different types of road categories include, e.g., expressways, primary roads, secondary roads, and the like.

An area threshold table 432 also communicates with the other navigation system components through the bus 414. The area threshold table defines speed threshold limits for various different areas, either predefined, defined by the user, or automatically defined by the system. The area threshold table includes geographical areas, areas corresponding to various routes defined by the user, and the like.

A video display 434 also communicates with the navigation system through the bus 414, or otherwise. The display 434 displays traffic congestion information to the user as processed by both the data receiver preprocessing functions, as well as the other functions in the navigation system.

In accordance with the present invention, the user, using any conventional input device such as a GUI, an example of which will be subsequently described in greater detail, stores at least one and preferably two speed threshold limits in a traffic speed table in the memory 59. Furthermore, in accordance with the present invention, the user is able to set the speed threshold limits in the traffic speed table as a function of many factors, such as geographic area, day of the week, weather, etc., all of which are described below.

For example, with reference now to FIG. 2, the geographical area of the United States is there shown by way of example only and divided into fourteen different geographical areas. One exemplary traffic speed table is shown in FIG. 3 in which the traffic speed categories, i.e. "smooth traffic", "light congestion" and "heavy congestion", vary as a function of geographical area. In FIG. 3 the various geographical areas 1–14, corresponding to the areas 1–14 in FIG. 2, each have three speed threshold limits, a first corresponding to smooth traffic, a second corresponding to light congestion, and a third corresponding to heavy congestion. For example, in area 3, a smooth traffic condition or category is defined as an average traffic speed of 60 miles per hour or greater. Light congestion for area 3 is defined as 40–60 miles per hour, while anything less than 40 miles per hour constitutes a heavy congestion traffic condition.

Figure 4:
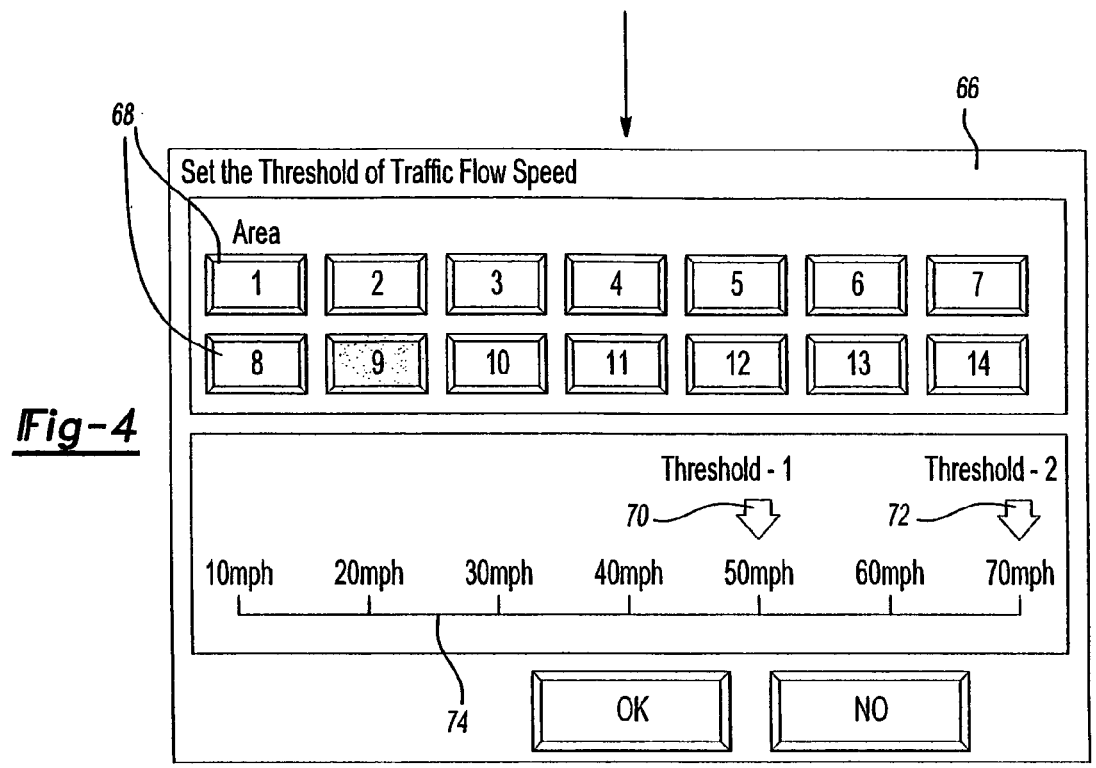
FIGS. 4–8 are all views of a GUI for setting the speed threshold limits as a function of geographic area.

With reference now to FIGS. 4–7, an exemplary GUI which allows the individual user to set and modify as desired the speed threshold limits corresponding to the various traffic flow categories in different geographical areas is shown. In FIG. 4 a touch screen 66, which is preferably the same as the display screen 63 (FIG. 1), displays a number of touch areas or buttons 68, each of which corresponds to one of the geographical areas 1–14 (FIG. 2). Additionally, a first threshold 70, corresponding to the maximum speed for a heavy congestion traffic flow condition, is also displayed on the touch screen 66. A second threshold 72, corresponding to the lower limit of a smooth traffic flow category, is also displayed on the touch screen 66.

The thresholds 70 and 72 cooperate with a speed indicator 74. For example, in FIG. 4, the first threshold 70 is set to 50 miles per hour and represents the minimum speed for a heavy congestion traffic flow condition in the selected geographical area 9. Similarly, the second threshold 72 is set to 70 miles per hour which corresponds to the minimum speed for a smooth traffic flow condition in area 9. The speeds between the thresholds 70 and 72, i.e. 50–70 miles per hour, correspond to a light congestion traffic flow condition.

Figure 5:
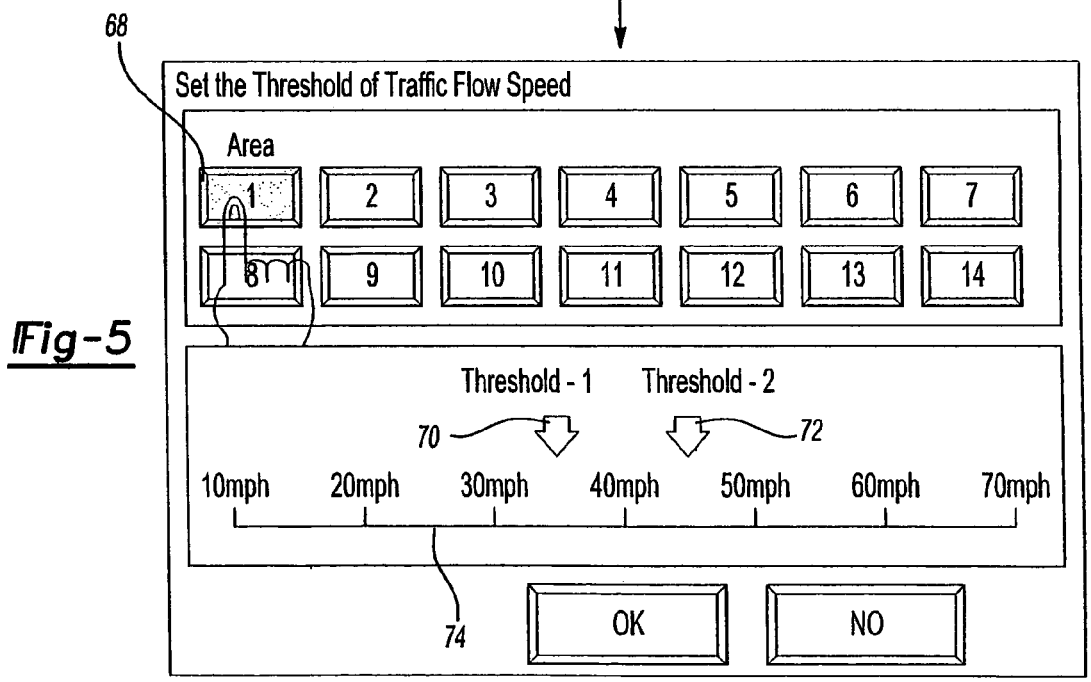
Figure 6:
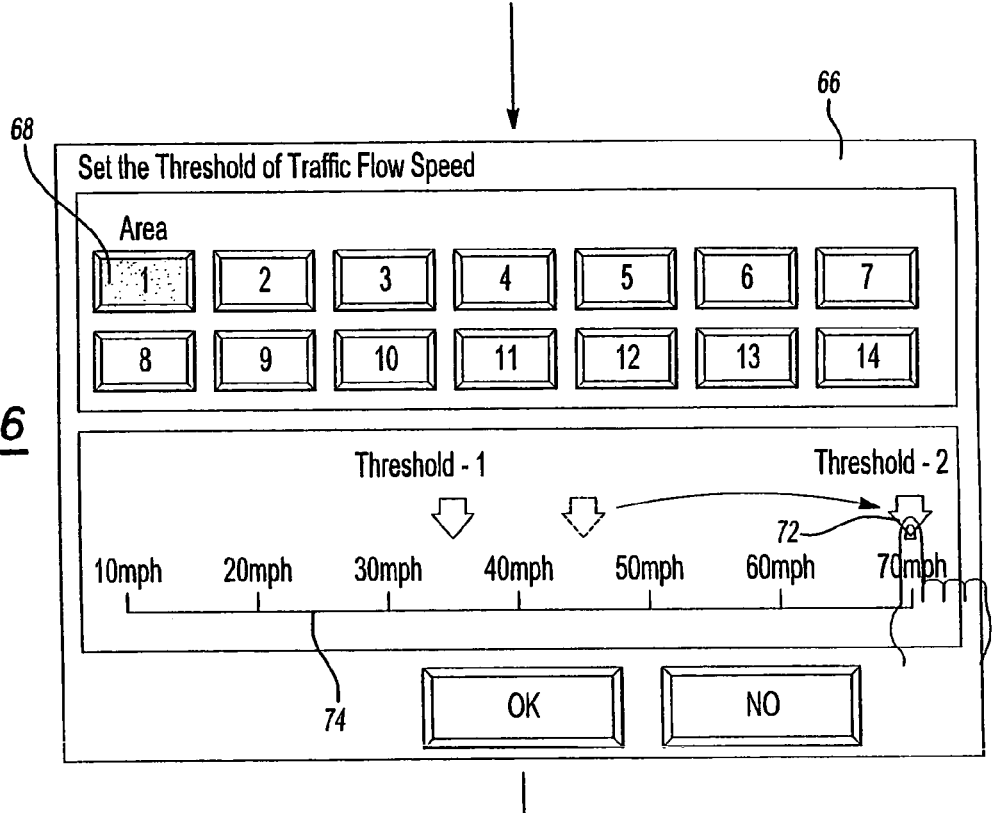

With reference now to FIG. 5, the speed thresholds for a different geographic area, namely area 1, are displayed by the user selecting the button 68 corresponding to area 1. Thus, the lower threshold 70 is aligned with the speed of 35 miles per hour on the speed indicator 74 while the second threshold 72 is aligned with the speed threshold 45 miles per hour thus corresponding to the speed threshold limits illustrated in FIG. 3.

The speed threshold limits for any and/or all of the geographical areas 1–14 may be modified as desired by the user. For example, in FIG. 6 the user has selected the geographic area 1 but has changed the second threshold 72, corresponding to the lower limit for a smooth traffic flow condition, from 45 miles per hour to 70 miles per hour. This is done by the user manually selecting the upper threshold 72 and moving the threshold 72 along the touch screen 66 from the position illustrated in phantom line and to the position illustrated in solid line.

Figure 7:
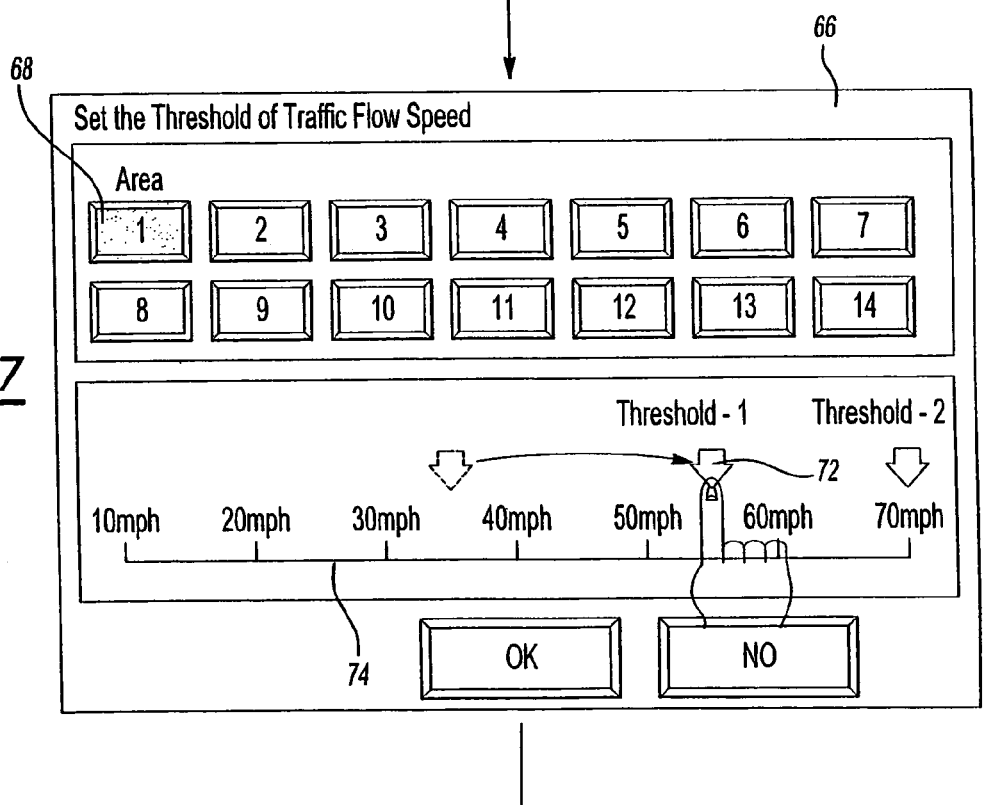

Similarly, as shown in FIG. 7, the user may also adjust the lower threshold 70 corresponding to the lower limit for a heavy congestion traffic flow condition by simply manually selecting or touching the lower threshold 72 and moving the threshold 72 along the touch screen 66 from the position shown in phantom line and to the position shown in solid line. Thus, as shown in FIG. 7, the threshold 70 has been moved from 35 miles per hour to 55 miles per hour.

Figure 8:
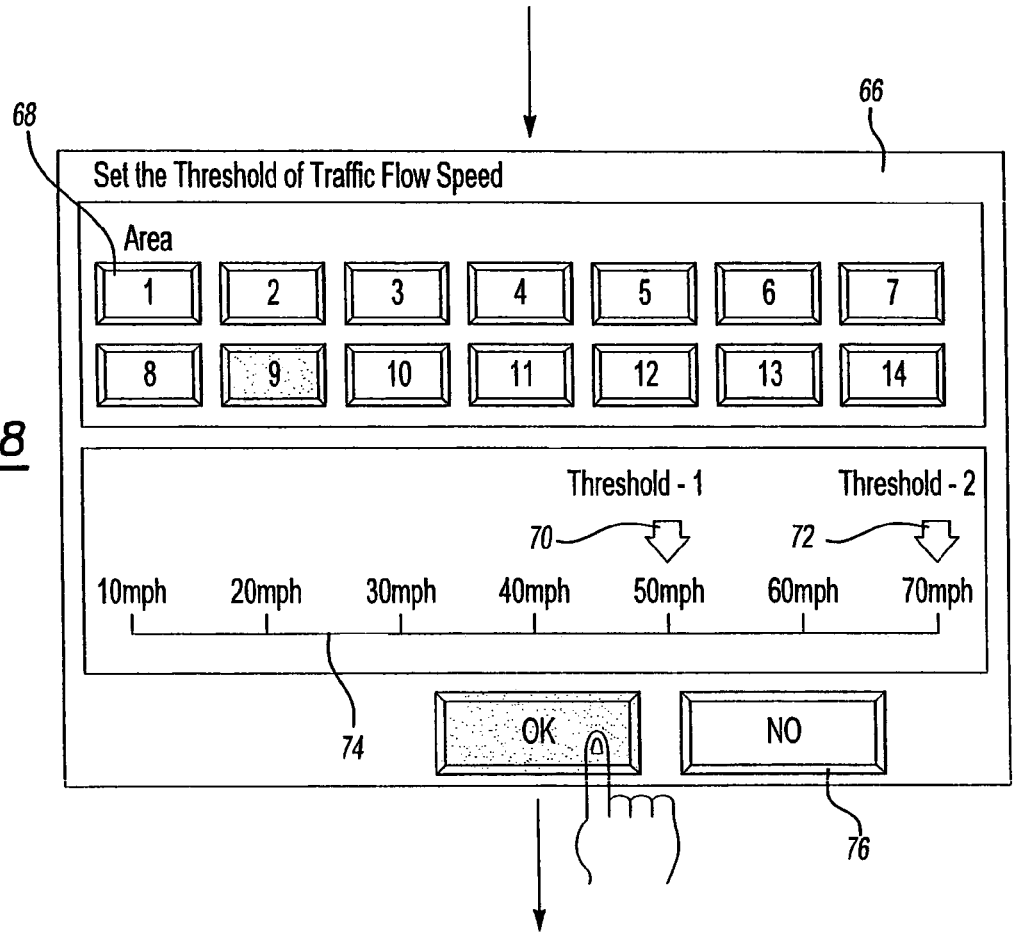

With reference now to FIG. 8, once the thresholds 70 and 72, and thus the thresholds in the traffic speed table in memory, have been adjusted as desired by the user for area 1, the user selects an OK button 74 to save the changes to the traffic speed table (FIG. 3) in memory 59. Alternatively, the user may select a NO button 76 on the touch screen 66 to disregard the changes and revert to the original speed thresholds 70 and 72 prior to the editing session.

The above adjustment for the speed threshold limits 70 and 72 for area 1 are then repeated, as desired by the user, for each of the other thirteen areas. Once completed, the various speed threshold limits for each geographic area 1–14 are saved to memory 59 in the traffic speed table.

It will be understood, of course, that the geographic areas depicted in FIG. 2 are by way of example only. The various geographic areas may be more localized, e.g. southeast Michigan, and optionally are user definable. For example, the geographical areas may correspond to a congested area, such as a central city area, or the surrounding highway areas from the central city area. The geographical areas could also be portions of the city, such as the east portion of a city versus the west portion of the city, where traffic patterns may be different.

The geographical areas may also be a predefined route or portions of the route, including predefined road lengths. For example, one route may include three distinct areas, e.g., local streets from the house and to a major highway, a second geographical area comprising the main highway from the local street and to or near a worksite, while the third geographical area may comprise the local streets around a worksite or other final destination.

The geographic area may either be preselected by the user or may be recorded and automatically defined during a driving session. In this latter event, the user, after selecting a driving session, may designate the initiation and termination of each geographic area through an appropriate GUI on the screen. Optionally, a vehicle may automatically record roads multiply driven in a given area and then assign these roads to geographic areas.

Although the various speed thresholds for the different geographic areas, regardless of how those geographic areas are defined, may be selected and set by the user, as described above; alternatively, these speed thresholds may be automatically determined and set by the system. For example, after a particular route has been driven a number of times, the average speeds for each of the road links on that particular route is determined by the system. The system then may automatically set the traffic thresholds for high traffic congestion and light traffic congestion by a predetermined speed offset from the average speed for the various road lengths. For example, if the average speed for a particular road length on a route that has been traveled several times is 40 miles per hour, the system may automatically set a light traffic congestion to 10 miles per hour above the speed, i.e., 50 miles per hour, and a high traffic congestion threshold at 10 miles per hour below the speed, i.e., 30 miles per hour. In this fashion, the system automatically sets the speed threshold limits for routes that are repeatedly driven.

In a still further aspect of the present invention, the speed threshold limits for individual drivers may be stored in a centralized database and transmitted to the vehicle through any conventional means, such as by a satellite transmission, cellular phone transmission, and the like. In this case, the car could identify the driver through any of a number of different ways, such as the key used by the driver, fingerprint, voiceprint, or other physical driver information, or merely information manually inputted by the driver. In this case, the personal speed threshold limits for the driver are received from the central database and stored in the system. This, in turn, would enable the driver to drive different cars while still maintaining access to the speed threshold limit information for that particular driver. Such different cars could be different cars not only owned by the person, but merely rented, borrowed, or otherwise driven by the person.

Figure 9:
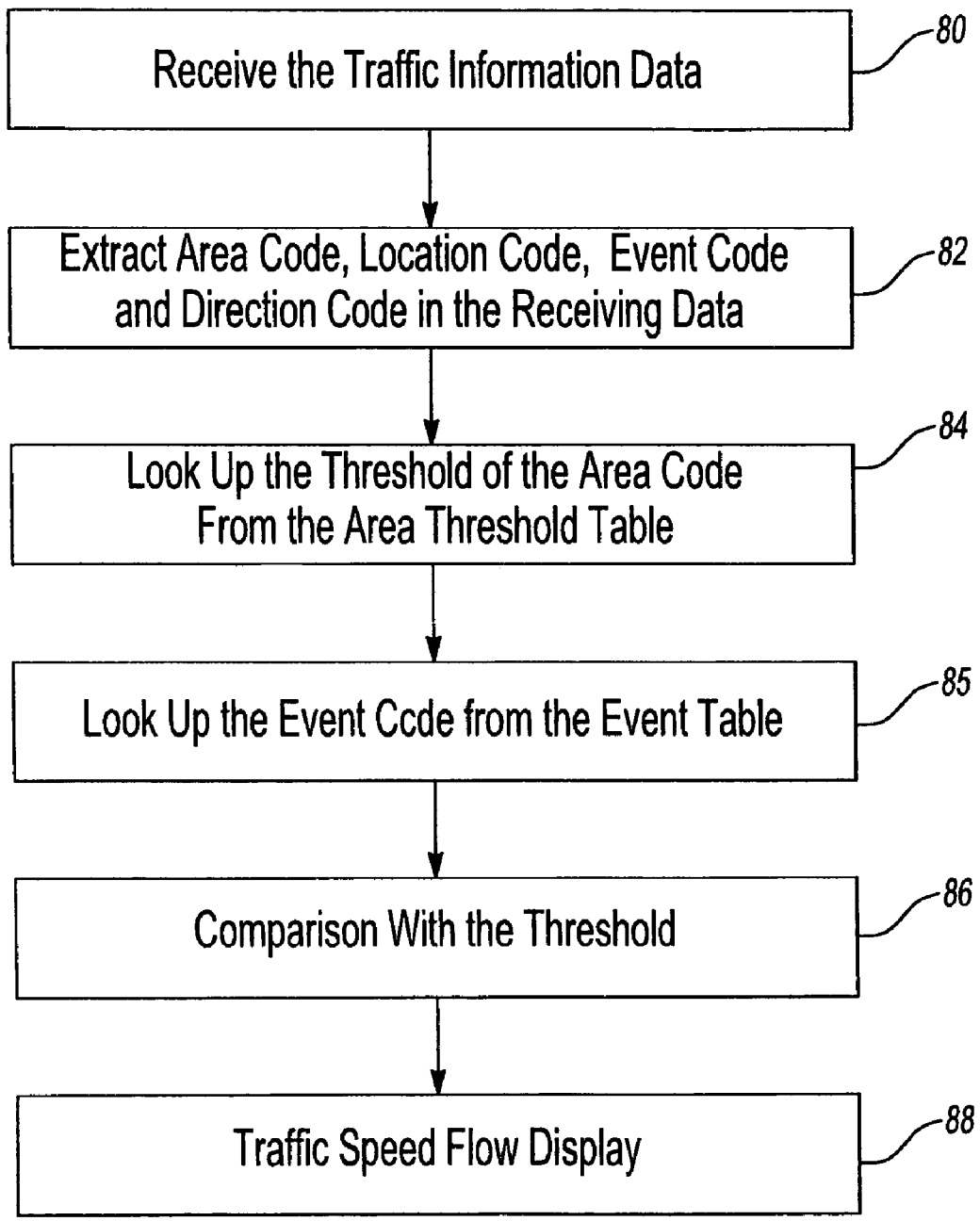
FIG. 9 is a flowchart illustrating the operation of a preferred embodiment of the invention which varies speed threshold limits as a function of geographic area.

With reference now to FIG. 9, a flowchart illustrating the operation of the invention is shown. At step 80 the data receiver 60 (FIG. 1) receives the traffic flow data or event codes for various road segments across the entire geographical area. Step 80 then branches to step 82 in which the area code in which the vehicle is located, as well as the event code and other data for the road segments, are extracted from the total data stream. For example, if only the geographic area corresponding to southeastern Michigan (area 9 in FIG. 2) is displayed on the display device for the navigation system 58, only the traffic flow data for that geographical area is extracted by step 82.

Step 82 then branches to step 84 which looks up the speed threshold limits for the selected geographical area, geographic area 9 in this example. Step 84 then branches to step 85 where the traffic speed for the road segments is determined from the event code table (FIG. 41) from the received traffic data. Step 85 then proceeds to step 86 where the traffic flow data for the various road segments is compared with the user designated speed threshold limits for the particular geographic area. Step 86 then branches to step 88 which displays the traffic flow conditions on the navigation system display screen.

Figure 10:
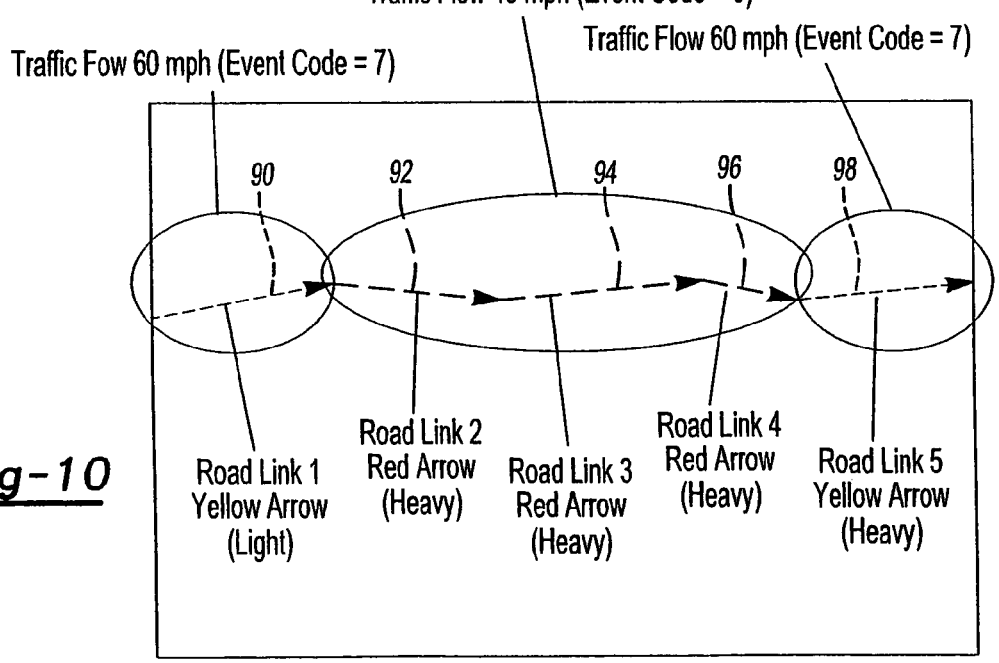
FIG. 10 is an exemplary view of a screen display in accordance with the present invention.

One exemplary display is illustrated in FIG. 10. In FIG. 10 a first road segment 90 is illustrated in one fashion, e.g. the color yellow, representing a light congestion traffic flow condition. Conversely, road segments 92, 94 and 96, all of which are under a condition of heavy congestion following a comparison of the traffic flow data with the speed threshold as established by the user, are depicted on the display screen in a fashion different from the light traffic flow condition of road segment 90. For example, the road segments 92, 94 and 96 are preferably depicted in the color red, as an indicator of a heavy congestion traffic flow condition.

Conversely, the final road segment 98 illustrated in FIG. 10 is experiencing a smooth traffic flow condition after the comparison of the traffic data for the road segment 98 and a comparison with the traffic speed table stored in memory by the user. As such, the road segment 98 is depicted differently than the road segments 90–96, e.g. by showing the road segment 98 in the color green on the navigation system display 63.

From the foregoing, it can be seen that the present invention allows a user to customize the navigation and traffic information display system by enabling the user to customize the system to vary the speed thresholds corresponding to smooth traffic, light congestion traffic and heavy congestion traffic as a function of the geographic area and the user's individual driving habits.

A still further feature of the present invention is that the speed threshold limits are modifiable by the user as a function of the type of road. For example, different road types may include a minor road, a major road, as well as a freeway. A traffic flow condition or vehicle speed corresponding to a smooth traffic flow condition on a minor road may correspond to a heavy traffic congestion at the same speed on a freeway. As before, these thresholds may be set and modified as desired by the user.

Figure 11:
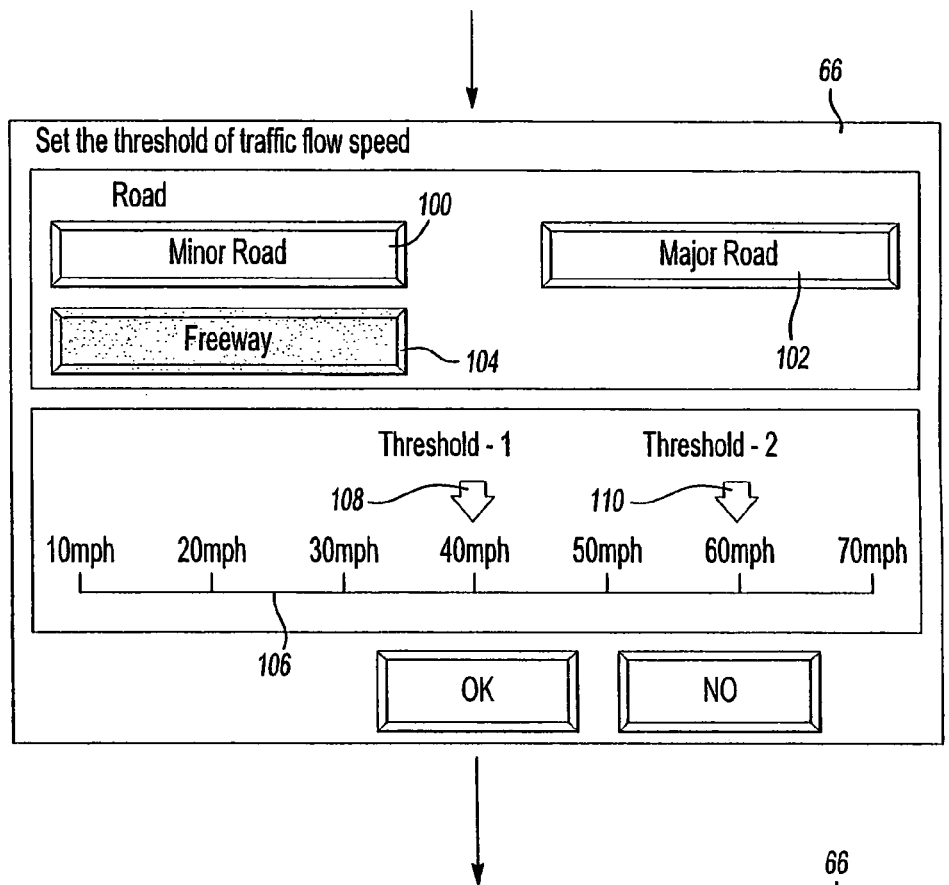
FIGS. 11–14 are views illustrating an exemplary GUI for setting the speed threshold limits as a function of road type.

With reference now to FIG. 11, an exemplary GUI for the threshold as a function of road type is shown in which three different road types are each displayed on the touch screen 66. These three road types correspond to a minor road 100, a major road 102, and a freeway 104 and such road type information is contained as a separate data field in the data transmission received from the satellite. Alternatively, a vehicle mounted or central database may be interrogated to determine the road type. A speed indicator 106 is also displayed on the screen 66 while two thresholds 108 and 110 are also shown on the screen 66 immediately above a speed range indicator 106.

Still referring to FIG. 11, the first threshold is aligned with 40 miles per hour and corresponds to the speed threshold limit for a heavy congestion traffic flow condition. Similarly, the second threshold 110 corresponds to the lower limit for a smooth traffic flow condition while the speed range between the two thresholds 108 and 110 corresponds to a light traffic congestion flow condition.

Figure 12:
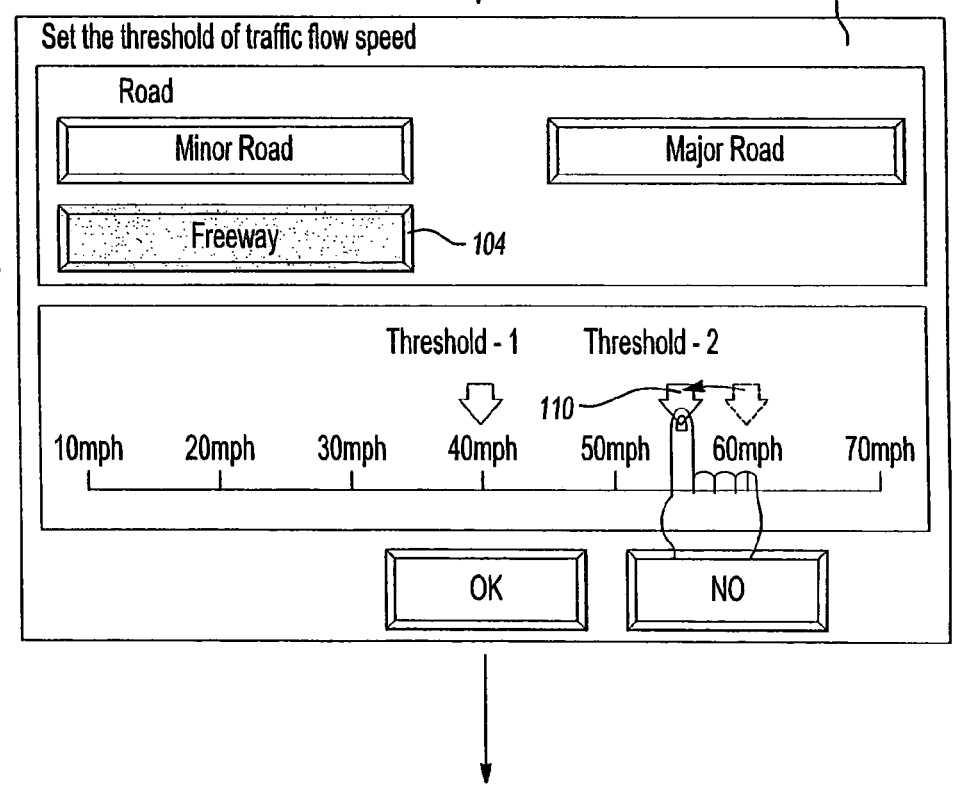
Figure 13:
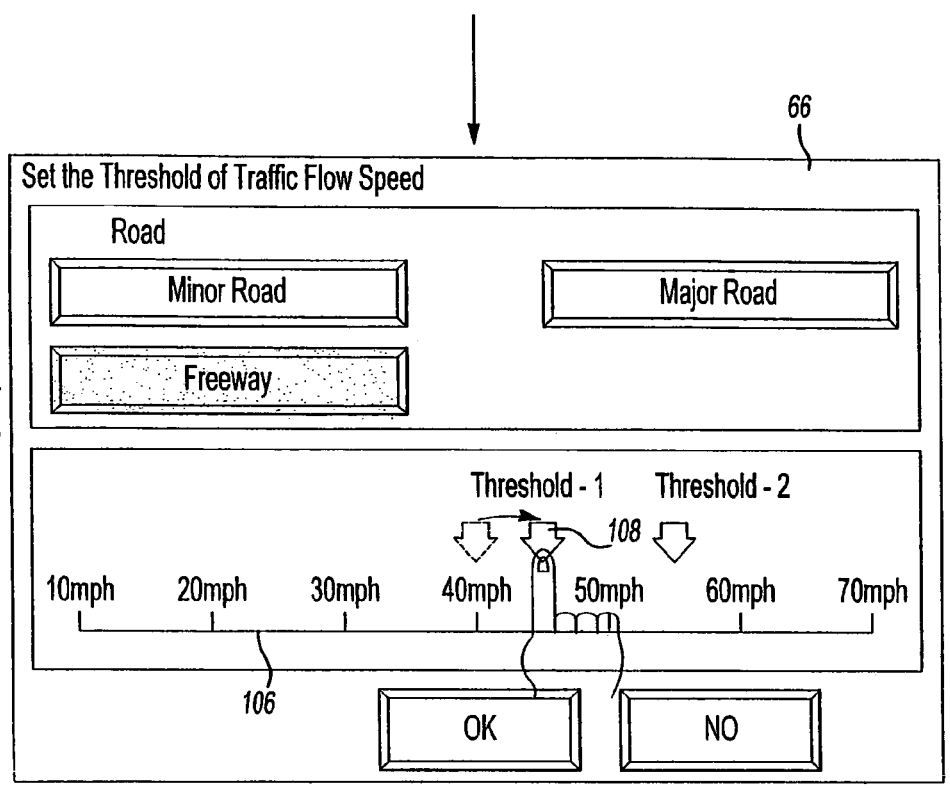

With reference now to FIG. 12, in order to modify the threshold limit 110, the user, after selecting the freeway selection button 104, drags the threshold 110 from the position shown in phantom line and to the position shown in solid line, thus changing the threshold speed limit from 60 miles per hour to 55 miles per hour. Similarly, as shown in FIG. 13, the threshold 108 may be changed by the user from 40 miles per hour to 45 miles per hour by the user manually selecting the threshold 108 on the touch screen 66 and moving the threshold 108 to the desired speed on the speed indicator 106.

Figure 14:
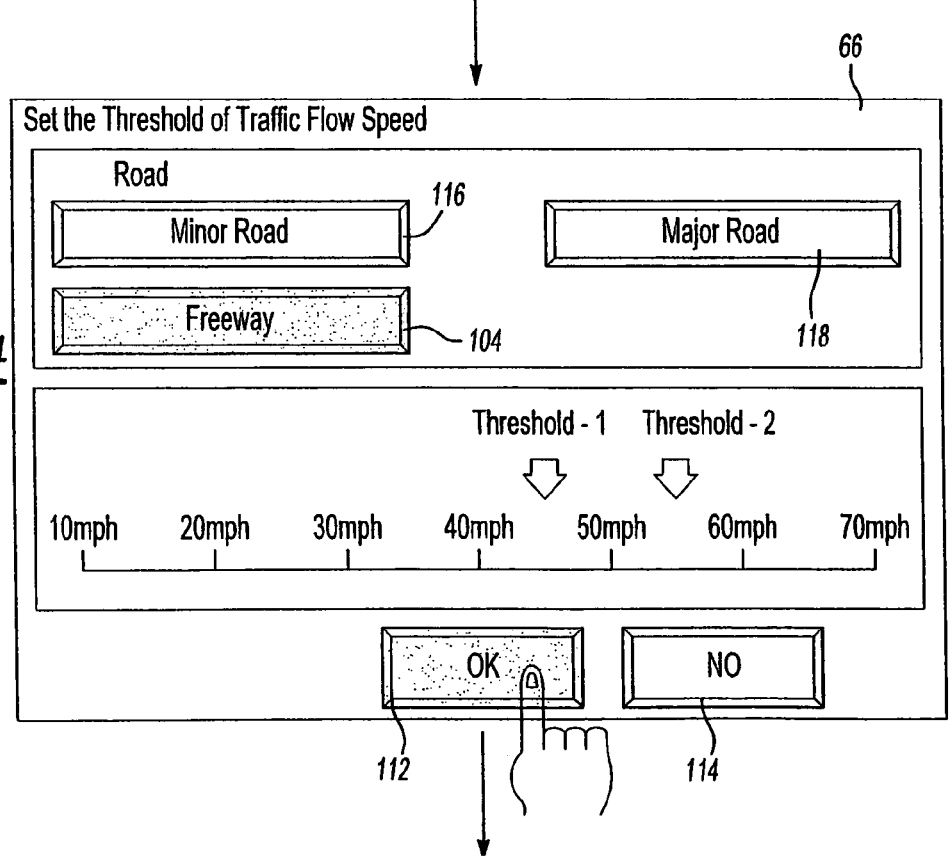

With reference to FIG. 14, once the thresholds 106 and 108 have been adjusted as desired by the user, the changes may be saved to the traffic speed table in memory by selecting the OK button 112 on the touch screen 66. All changes made by the user during the editing session may alternatively be disregarded if the user selects the NO button 114 on the touch screen 66, in which case the threshold limits as a function of road type in the traffic speed table will remain unchanged.

In a similar fashion, the user may set the speed threshold limits for the other types of roads, e.g. the minor roads and major roads, by following the above procedure after selecting either the minor road button 116 (FIG. 14) or major road button 118 on the touch screen 66 in lieu of the freeway road type button 104.

Figure 15:
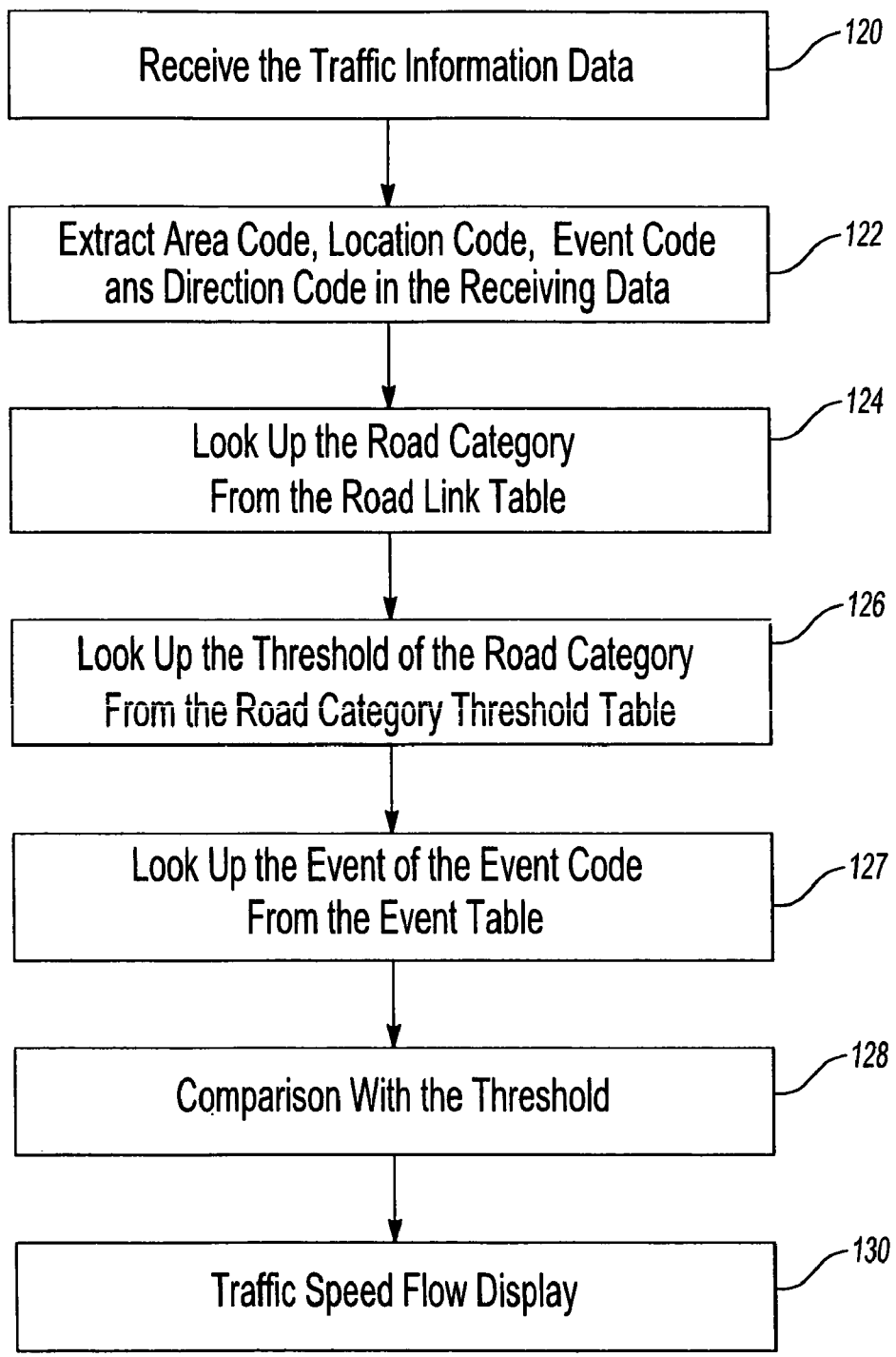
FIG. 15 is a flowchart illustrating the operation of the present invention which displays a map as a function of the speed threshold limits in accordance with road type.

With reference now to FIG. 15, a flowchart illustrating the operation of the invention in which the speed threshold limits are utilized to display the information on the display screen as a function of road type is shown. At step 120 the navigation system receives the traffic information data and then extracts the appropriate data at step 122 in the same fashion as described with respect to step 82 (FIG. 9). Step 122 then branches to step 124.

At step 124, the system determines the road type, i.e. minor road, major road or freeway, from a road segment link table contained in memory. An exemplary road link table is illustrated in FIG. 42. Step 124 then branches to step 126.

At step 126, the system then determines the threshold as set by the user as a function of the road type. Step 126 then proceeds to step 127 where the traffic speed for the road segments is extracted from the event code table (FIG. 41) of the received data. Step 127 then proceeds to step 128 where the traffic speed determined from the event code is compared with the speed thresholds corresponding to the road type as modified by the user and determines for each displayed road segment whether the road segment is within the definition of smooth traffic, light congestion traffic or heavy congestion traffic. Step 128 then branches to step 130 which displays the appropriate data in the fashion shown in FIG. 10.

Optionally, the individual road types may be cross-checked to the designated area which may have different thresholds corresponding to the different road types. For road types that are frequently driven by a user, e.g., the route from a user's home to his or her place of work, the individual speed threshold limits, which have been determined as previously described, would override the general setting for the particular type of road types.

Figures 16, 17:
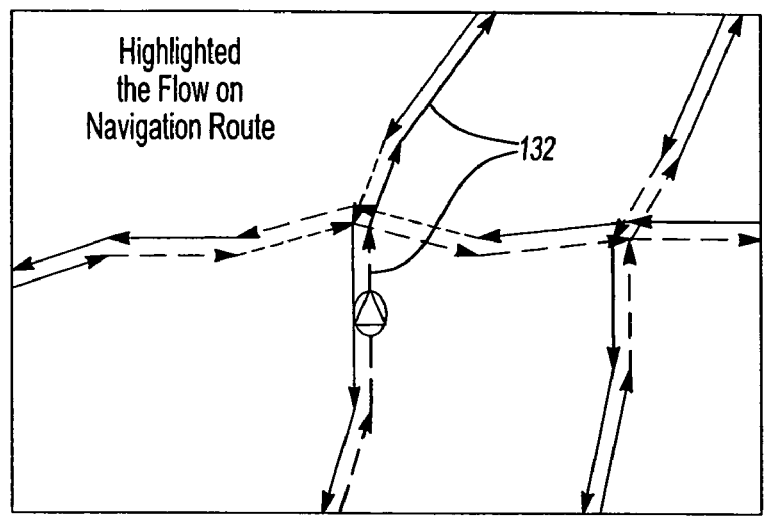
FIG. 16 is an exemplary display of the navigation system showing the designated route highlighted.
FIG. 17 is an exemplary road segment link table.

Many navigation systems allow the user to input a destination into the system. The navigation system then displays a suggested route from the current position of the vehicle and to the vehicle destination. As shown in FIG. 16, the suggested route for the vehicle is preferably highlighted as shown at 132 to enable the driver to see the suggested route in just a quick glance at the display screen 66 for the navigation system.

With reference now to FIG. 17, the navigation system 58 utilizes link ID numbers, each of which corresponds to a road segment. An exemplary navigation route is shown in FIG. 7 and consists of a plurality of sequential road links, each of which corresponds to a road segment.

Figure 18:
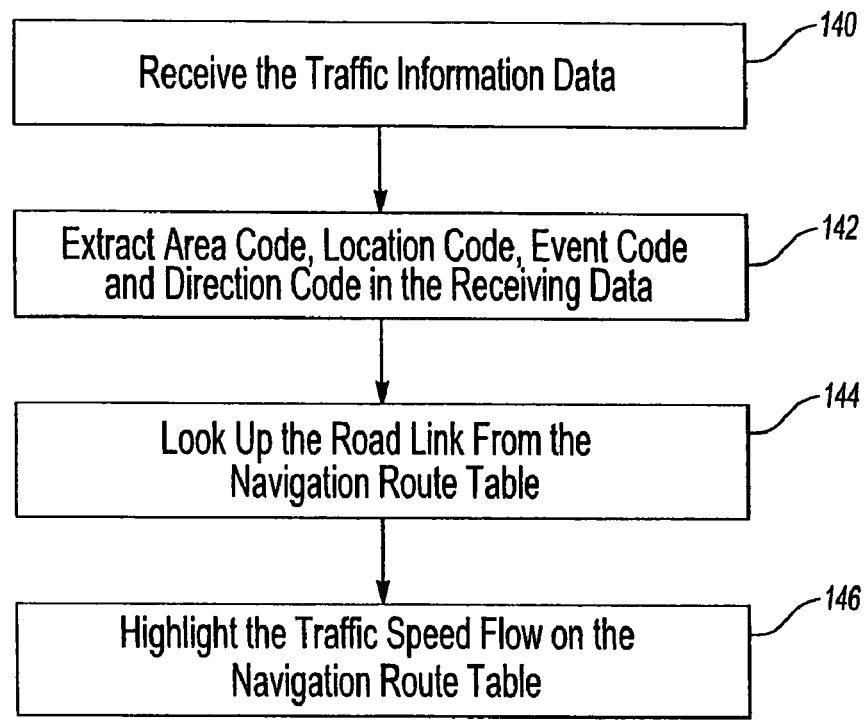
FIG. 18 is a flowchart illustrating the method for highlighting the road segments for a predetermined route.

A flowchart illustrating the method of highlighting the suggested route from the current position of the vehicle and to a destination position is illustrated in FIG. 18. At step 140, the vehicle receives the traffic flow data and then extracts the relevant data at step 142 in the same fashion as step 82 in FIG. 9. Step 142 then branches to step 144.

At step 144 each road link or road segment from the stored route (FIG. 17) is identified. Step 144 then branches to step 146 where the route from the current vehicle position and towards the destination is highlighted as shown at 132 in FIG. 16. This enables the driver to determine the destination route at a quick glance.

Under certain conditions, the traffic data signal from the satellite may not be received by the vehicle. This may be due to any of a number of reasons including atmospheric conditions, obstructions or even a malfunction of the navigation system. In this event, the data displayed on the screen for the navigation system may be totally inaccurate and the vehicle operator may not otherwise recognize that the displayed information on the navigation system screen is not accurate or at least not up to date.

Figure 19:
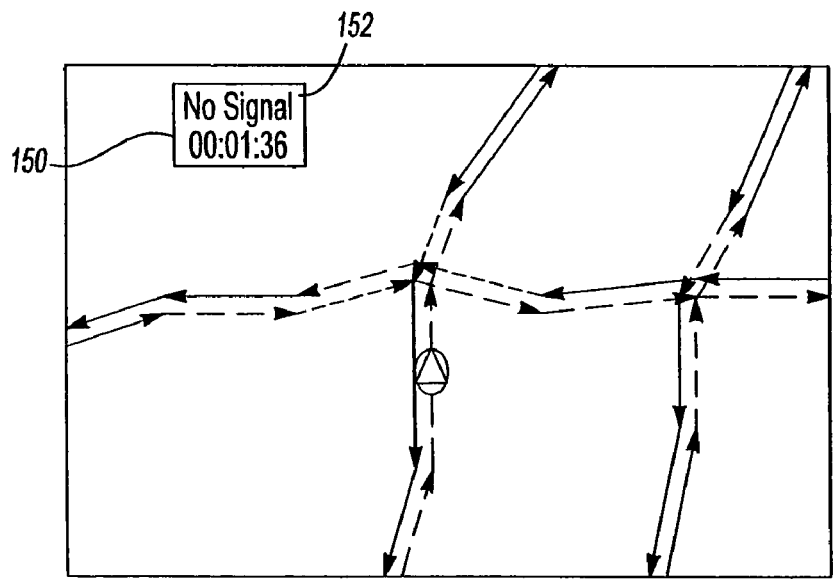
FIGS. 19–22 are all exemplary screen displays of the navigation system.

With reference now to FIG. 19, in the event that the traffic data signal is not received by the navigation system, the present system provides a visual indicator 150 on the navigation screen to advise the operator of the loss of the signal. Additionally, the indicator 150 preferably includes a time indicator 152 of the elapsed time since the last received valid data signal. The elapsed time indicator also allows the user to know when the displayed traffic information was last updated.

Figure 20:
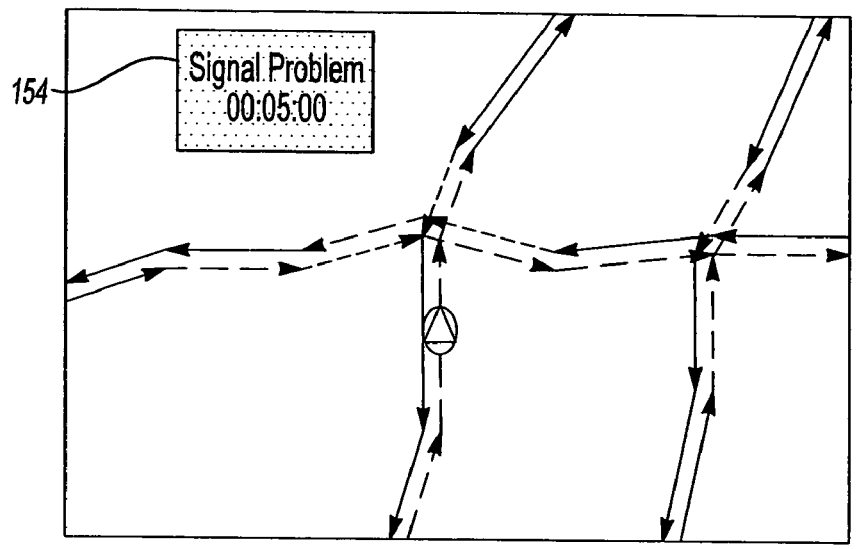

In the event that the signal is lost for a long period of time, e.g. five minutes or more, such an extended loss of signal is indicative of a serious problem, such as an antenna problem or other system malfunction. In this event, as shown in FIG. 20, an indicator is displayed on the navigation display screen to advise the operator that a serious malfunction has occurred. The malfunctioning information can also be sent to a centralized service center by another transmission medium, such as a cellular telephone network or other wireless system.

Figure 21:
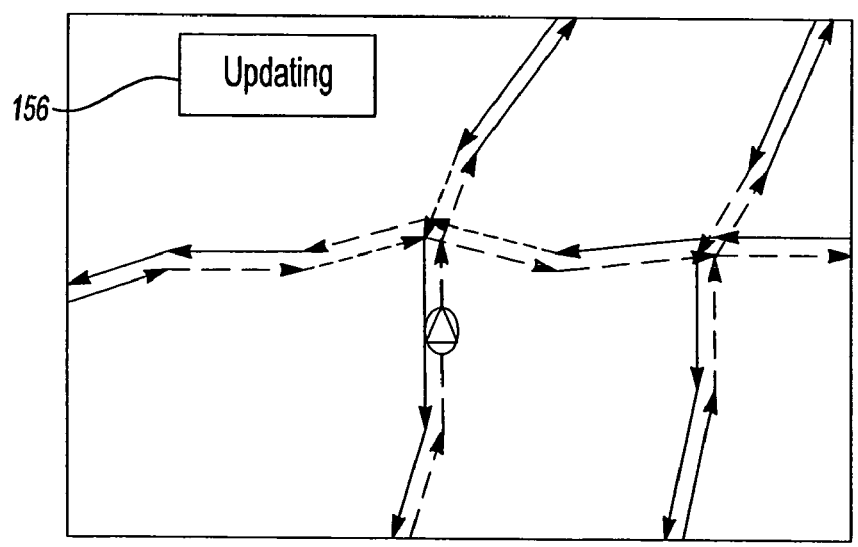
Figure 22:
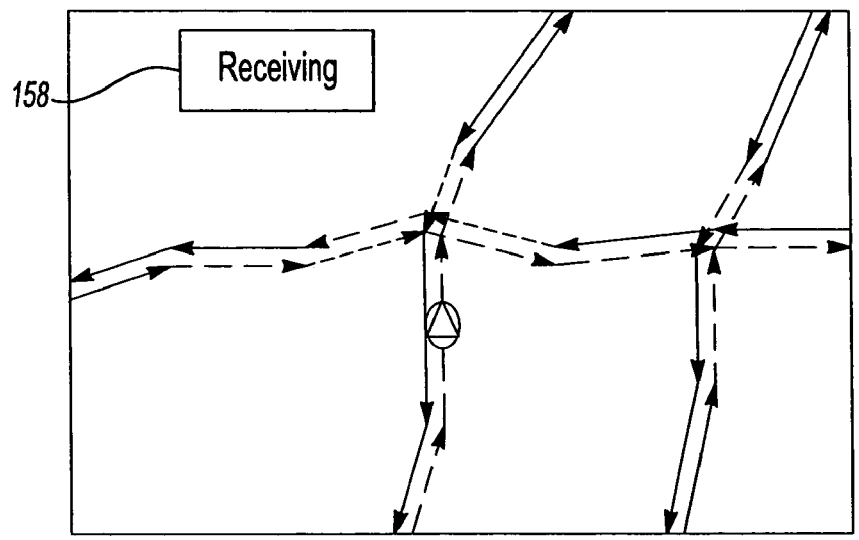

With reference now to FIG. 21, after the traffic data signal has been lost and subsequently reacquired, a display indicia 156 is shown on the display screen for the navigation system to advise the operator that the system is currently updating its data. Similarly, as shown in FIG. 22, different indicia is displayed on the display screen for the navigation system to indicate that the traffic data signal is currently receiving data.

The traffic data signal also includes information relating to traffic events on the various road segments since different traffic events are assigned different event codes (FIG. 41). These traffic events potentially affect traffic flow and include, for example, "road work", "flooded road", "major accident", as well as other road events which potentially have or will affect traffic flow. One example of the traffic event information is defined in the ISO standard 14819. Furthermore, these various traffic events will have a different priority depending upon their impact or potential impact on traffic flow and these priorities are stored in a traffic event priority table. For example, a "bridge out" traffic flow event will presumably have a much greater impact on the traffic flow than a "minor accident" traffic event.

Figure 23:
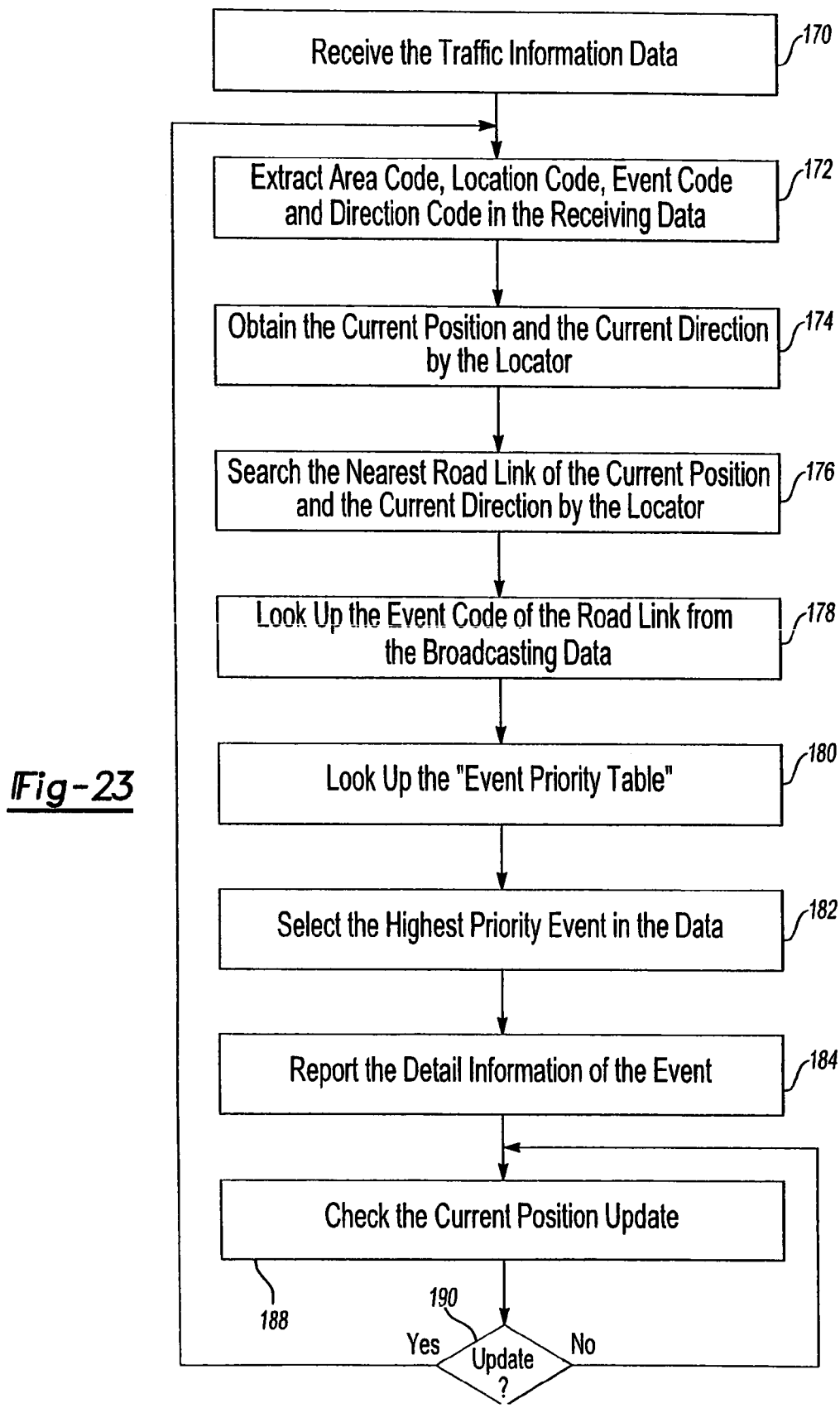
FIG. 23 is a flowchart illustrating the operation of a preferred embodiment of the present invention.

With reference now to FIG. 23, a flowchart is shown illustrating the operation of the present system for determining traffic events and selecting the traffic flow event having the highest priority, i.e. the traffic event having the greatest impact on traffic flow. At step 170 the receiver receives the transmitted traffic flow data signal and then branches to step 172 which extracts the relevant information from the received data signal including the event code of traffic events in the relevant displayed area. Step 172 then branches to step 174.

At step 174 the current position of the vehicle is determined as well as the direction of the vehicle along the various road links. Step 174 then branches to step 176 which determines the nearest road link of the current position and direction as determined at step 174. Step 176 then branches to step 178 which determines the event code of the upcoming road link from the received data.

Step 178 then branches to step 180 where the system looks up the event priority table for the upcoming road segments from the traffic event priority table and then proceeds to step 182 where the traffic event having the highest priority on the upcoming road segments is selected. Step 182 then proceeds to step 184.

Figure 24:
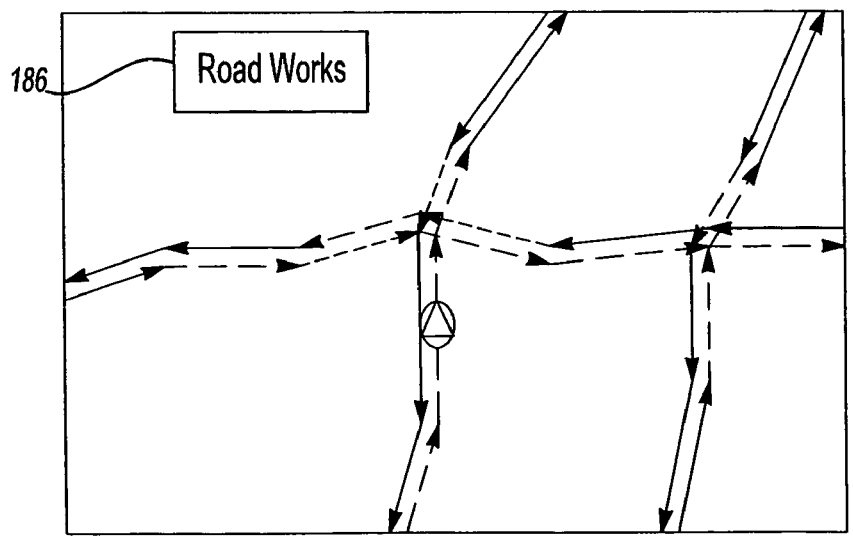
FIG. 24 is an exemplary screen display for the navigation system.

With reference now to FIGS. 23 and 24, at step 184 the system, having determined the traffic event on the upcoming road segments having the highest priority, then displays appropriate indicia 186 (FIG. 24) corresponding to the traffic event on the navigation system display screen at step 184. Different indicia, of course, will be used for different road events. For example, different colors, icons, or text could be used.

Step 184 then proceeds to step 188 where the system determines the current position of the vehicle. Step 188 then proceeds to step 190 which determines if an update of the display of the traffic event is required as a function of the vehicle position. If not, step 190 branches back to step 188. Conversely, in the event that the vehicle has changed its position by an amount sufficient to require an update for the display on the navigation screen, step 190 branches back to step 172 where the above process is repeated.

Figures 27, 28:
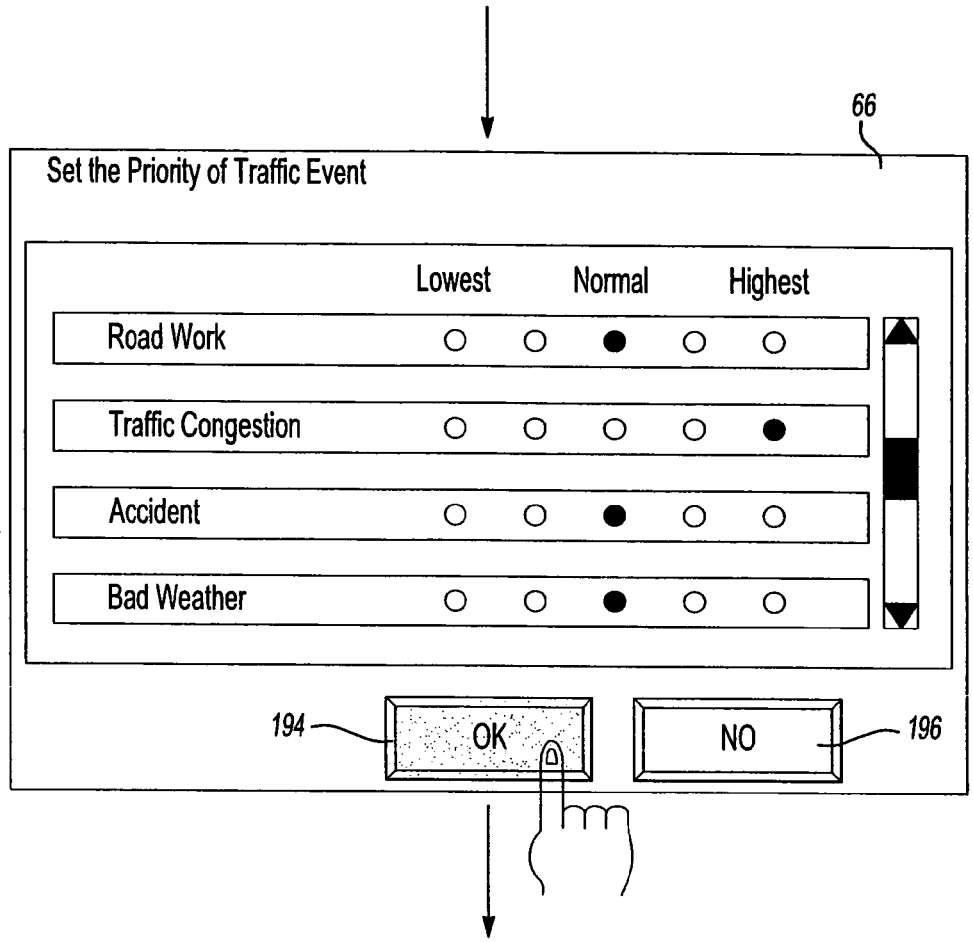

With reference now to FIGS. 25–27, in the preferred embodiment of the invention the user is able to vary the priority for the various traffic events to suit the particular needs, requirements or taste of the user. In FIG. 25, a menu is displayed on the display screen for the navigation system which enables the user to vary the priority of the various traffic events. For example, in FIG. 25 four different traffic events, "road work", "traffic congestion", "accident" and "bad weather", are displayed as four different types of road events. A scroll bar 192 which is manually operable by the user allows the user to scroll to different types of traffic events.

Still referring to FIG. 25, an array of five radio buttons 193 extending over three priority levels, "lowest", "normal" and "highest", are displayed for each traffic event. FIG. 25 also discloses an exemplary default setting for the priority of the traffic events.

With reference now to FIG. 26, using the touch screen 66 of the navigation system, the user is able to change the priority of the individual traffic events. For example, the user may change the priority level for the traffic event "road work" from the highest priority setting to a normal or mid priority setting by merely selecting a new priority for that traffic event on the touch screen.

With reference now to FIG. 27, after the priorities have been set by the user for all of the different traffic events, or at least those traffic events that the user desires to change the default priority of the traffic event, the user selects an OK button 194 to save the changes in the traffic event priority table stored in memory. Conversely, the user can select a NO button 196 on the touch screen in which case all of the changes made by the user to the traffic event priority table during the editing session will be disregarded.

With reference now to FIG. 28, the definition of smooth traffic, light congestion traffic or heavy congestion traffic may also vary as a function of the weather. For example, as shown in FIG. 28, under sunny weather conditions, smooth traffic is defined as 60 miles per hour or more. Conversely, in slippery snow weather, smooth traffic is defined as 35 miles per hour or more. Furthermore, the various information for the traffic flow definitions as a function of weather are stored in a weather condition threshold table stored in memory.

Figure 29:
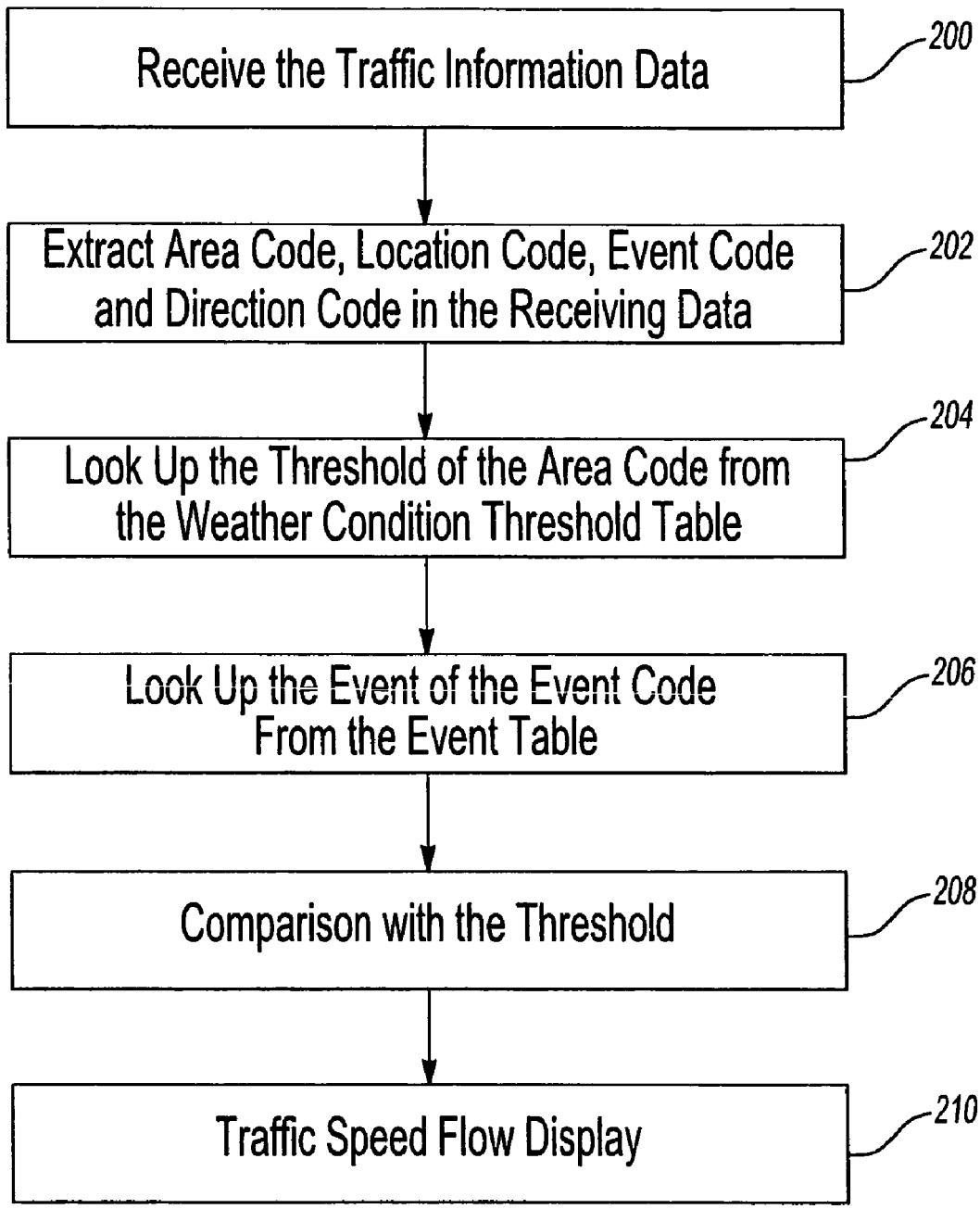
FIG. 29 is a flowchart illustrating the operation of one preferred embodiment of the present invention.

With reference now to FIG. 29, a flowchart for modifying the traffic display on the navigation screen as a function of weather conditions is illustrated. At step 200 the navigation system receives the traffic data which also includes weather information data. Step 200 then branches to step 202 where the relevant information for the various road segments is extracted from the received data relative to the position of the vehicle in the same fashion as step 82 in FIG. 9. Step 202 then branches to step 204.

At step 204, the system determines the threshold of the speed threshold limits as a function of weather from the weather condition threshold table (FIG. 28). Step 204 then proceeds to step 206 where the traffic speed for the road segment is determined from the event code for the road segment. Step 206 then proceeds to step 208 which compares the traffic speed from step 206 with the speed threshold determined at step 204 and then proceeds to step 210 where the traffic flow condition is displayed on the navigation system display screen.

Figure 30:
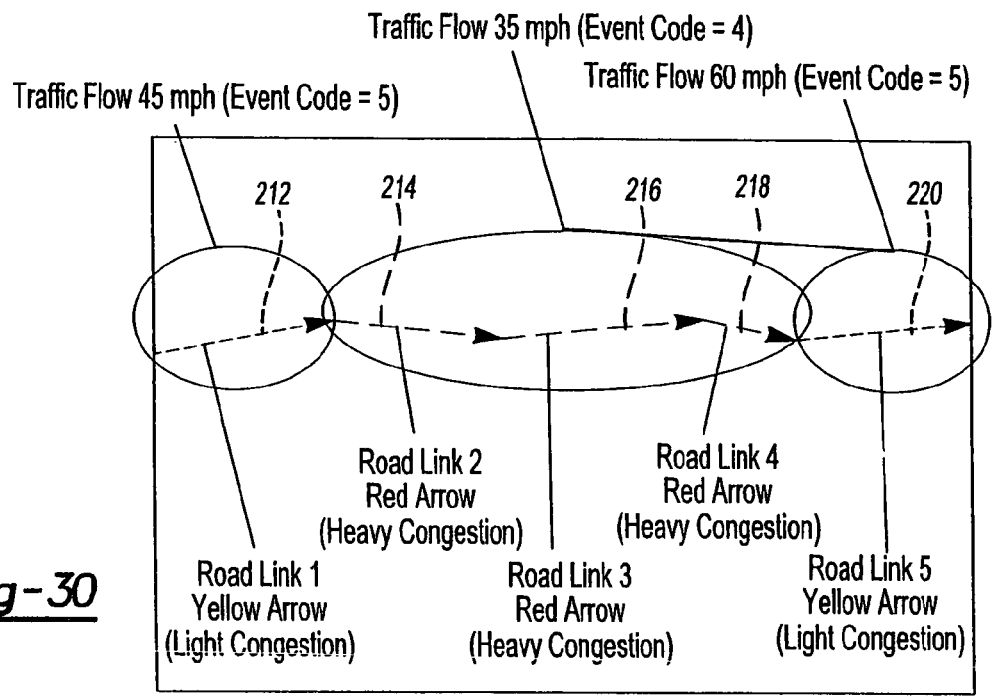
FIGS. 30–31 are exemplary screen displays for the navigation system.

For example, with reference now to FIG. 30, five road segments 212, 214, 216, 218 and 220 are illustrated under sunny weather conditions. Under these conditions the road segment 212 is illustrated as a light traffic congestion condition, segments 214–218 are illustrated as heavy congestion traffic conditions, while road segment 220 is illustrated as a light traffic congestion condition.

Figure 31:
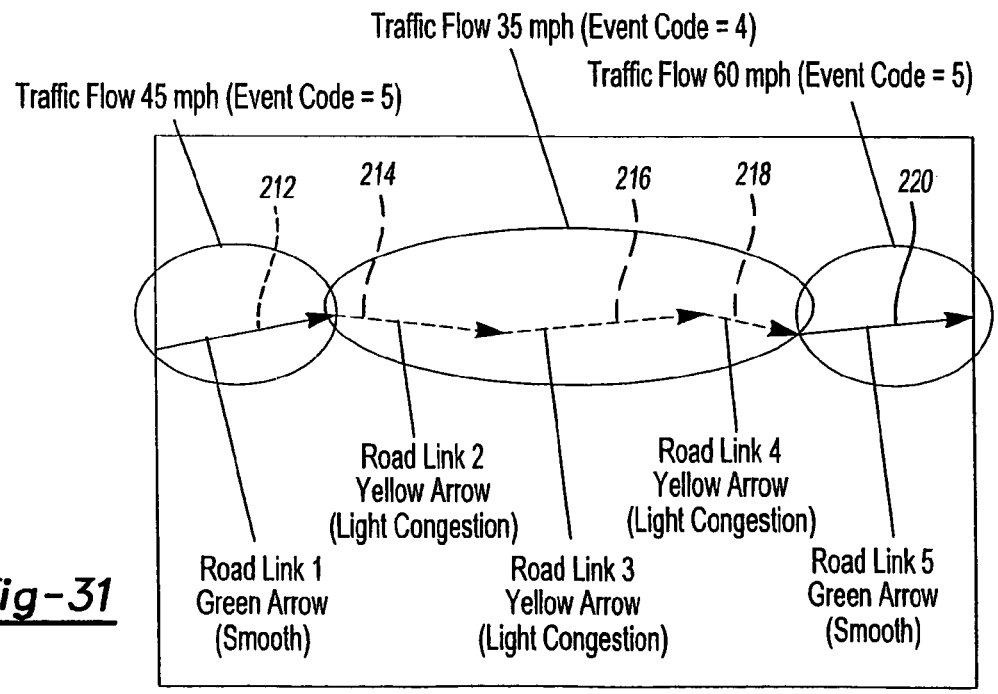

With reference now to FIG. 31, FIG. 31 illustrates the identical traffic flow or speed conditions shown in FIG. 30 but during a rainy day weather condition. Thus, in accordance with the flowchart illustrated in FIG. 29, the event codes corresponding to light traffic congestion, heavy traffic congestion and smooth traffic are modified as a function of weather. When this is done, the road segment 212 is displayed as a smooth traffic flow condition, road segments 214–218 are displayed as light traffic congestion, and road segment 220 is displayed as smooth traffic condition. It will be understood, of course, that other traffic conditions may result in other traffic displays corresponding to the exact traffic flow conditions.

Figure 32:
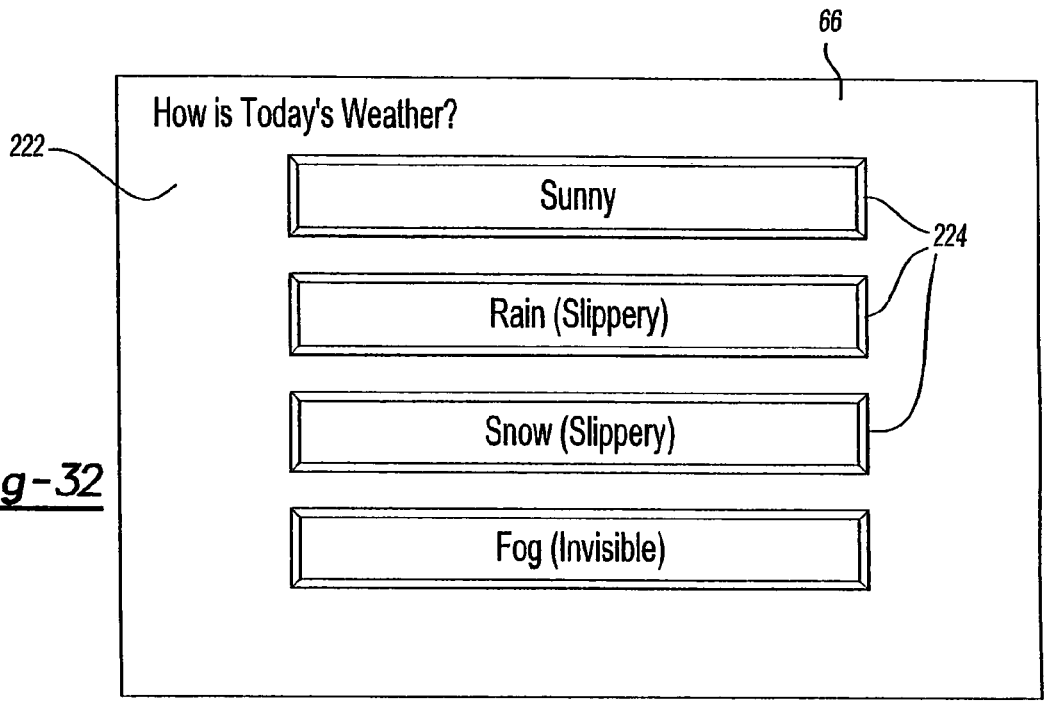
FIG. 32 illustrates an exemplary screen display for a menu for inputting the weather.

With reference now to FIG. 32, in order to enable the weather condition table (FIG. 28) to vary the output display as a function of weather, a menu 222 is displayed on the touch screen 66 for the navigation system. This menu 22 includes a plurality of buttons 224, each of which corresponds to a different weather condition. The user manually selects the weather condition most closely corresponding to the current weather. Upon such selection, the display is modified in accordance with the weather condition threshold table. Alternatively, the weather may be determined automatically, such as by data transmission.

Figure 33:
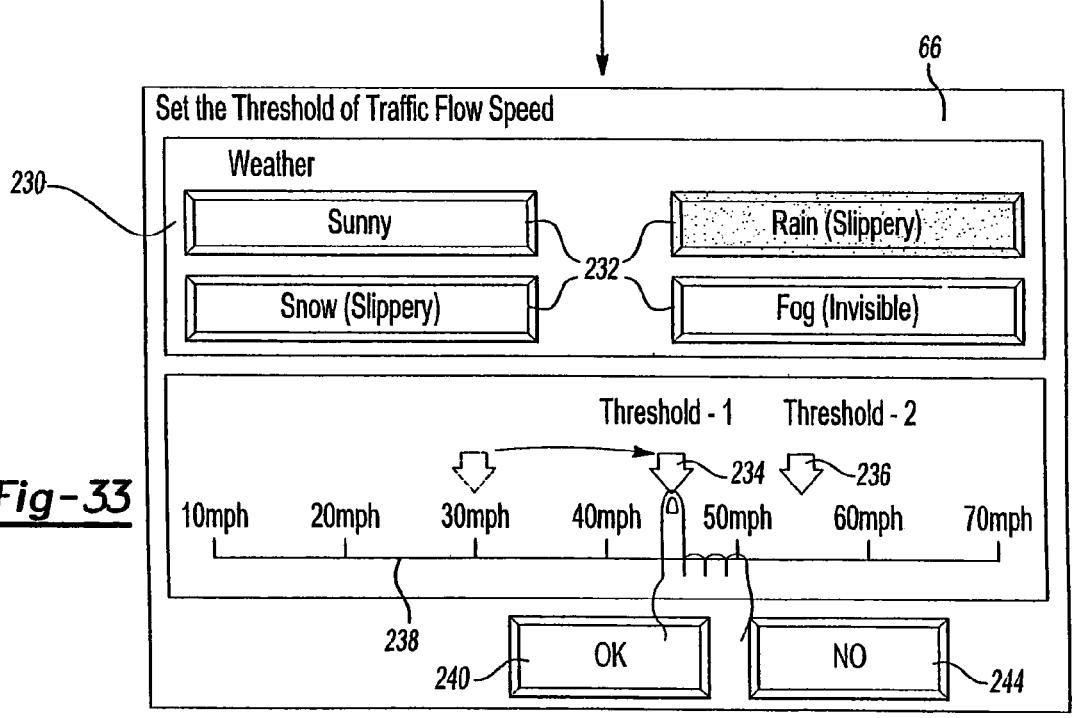
FIG. 33 is an exemplary screen display for setting the speed threshold limits as a function of weather.

With reference now to FIG. 33, the user may customize the weather condition threshold table (FIG. 28) by using the touch screen 66 on the navigation system. As shown in FIG. 33, a menu 230 having different buttons 232 is illustrated where each menu selection button 232 corresponds to a different weather condition. The user selects the desired weather condition button, e.g. the button corresponding to a slippery rain condition, by simply pressing that button 232 on the menu 230. Alternatively, the automobile may be able to sense the weather condition by determining the temperature and moisture level with the sensors, by analyzing visual images obtained by an onboard digital camera, by accessing the internet or other centralized weather database, or by accessing car functions. For example, the system may access the operation of the windshield wipers which would be indicative of a rain or snow condition.

Still referring to FIG. 33, the two thresholds 234 and 236 from the table 228 are also displayed on the screen 66 and cooperate with a speed range display 238 on the screen 66. The user may vary either or both thresholds for the weather speed condition table by simply touching the threshold 234 or 236 and moving the threshold relative to the speed range indictor 238. For example, as shown in FIG. 33, the lower threshold is moved from the position shown in phantom line of 30 miles per hour to the position shown in solid line at 45 miles per hour.

After the thresholds 234 and 236 have been set for the various weather conditions, the user may save the modified threshold limits in the weather condition table (FIG. 28) by pressing the OK button 240 on the screen 66. Alternatively, by pressing the NO button 244 on the touch screen 66, all changes made by the user during the editing session will be disregarded.

With reference now to FIG. 34, the definition of smooth traffic, light congestion traffic and heavy congestion traffic may also be varied as a function of the day of the week. As such, FIG. 34 shows a day of the week threshold limit table which is also stored in memory. For example, as shown in FIG. 34, the definition of smooth traffic on a Monday will be 55 miles per hour or greater while on a Saturday, the definition of smooth traffic will be 60 miles per hour or greater.

FIG. 35 represents the flowchart which modifies the speed threshold limits as a function of the day of the week. At step 250 the system receives the data and then proceeds to step 252 where the appropriate data is extracted from the received data. Step 252 then proceeds to step 254.

Step 254 then extracts the speed threshold limits from the day of the week table (FIG. 34) and then proceeds to step 256 where the traffic speed for the road segment is extracted from the code of the received data. Step 256 then proceeds to step 258.

At step 258, the system compares the day of the week speed threshold with the traffic speed determined at step 256 and then displays the result of that comparison on the display 63 at step 260. As such, the actual navigation system display 63 may vary depending upon the day of the week even under identical traffic flow conditions.

Figure 36:
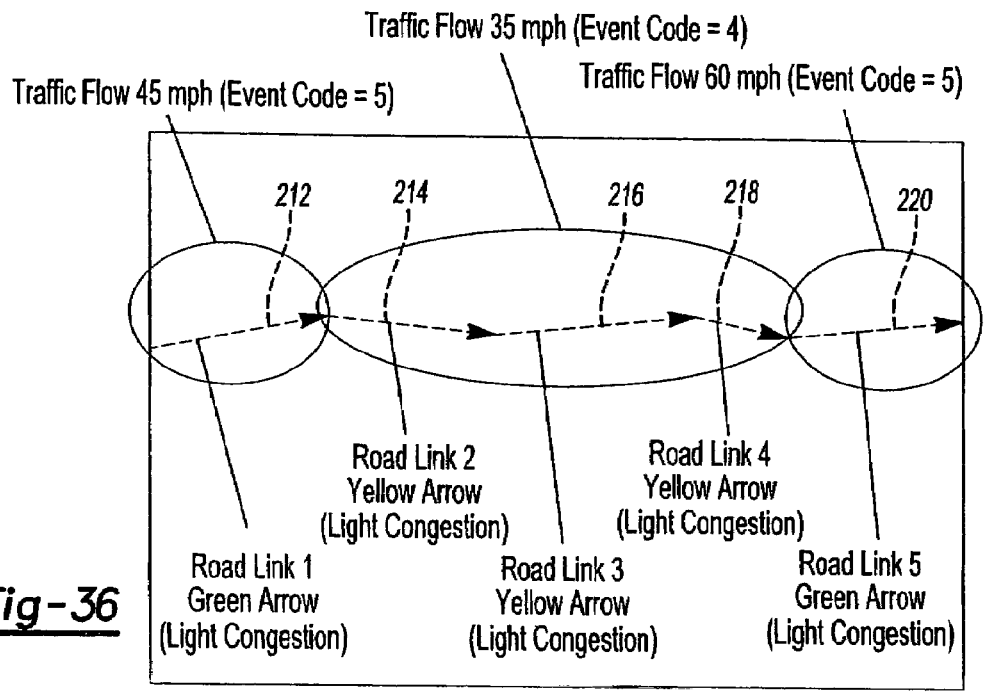
FIGS. 36–37 are exemplary screen displays for the navigation system.

For example, FIG. 36 illustrates a traffic flow display for the road segments 212–220 for the day of the week Monday–Friday. Under these conditions, each of the road segments 212–220 are illustrated as a light congestion traffic flow condition.

Figure 37:
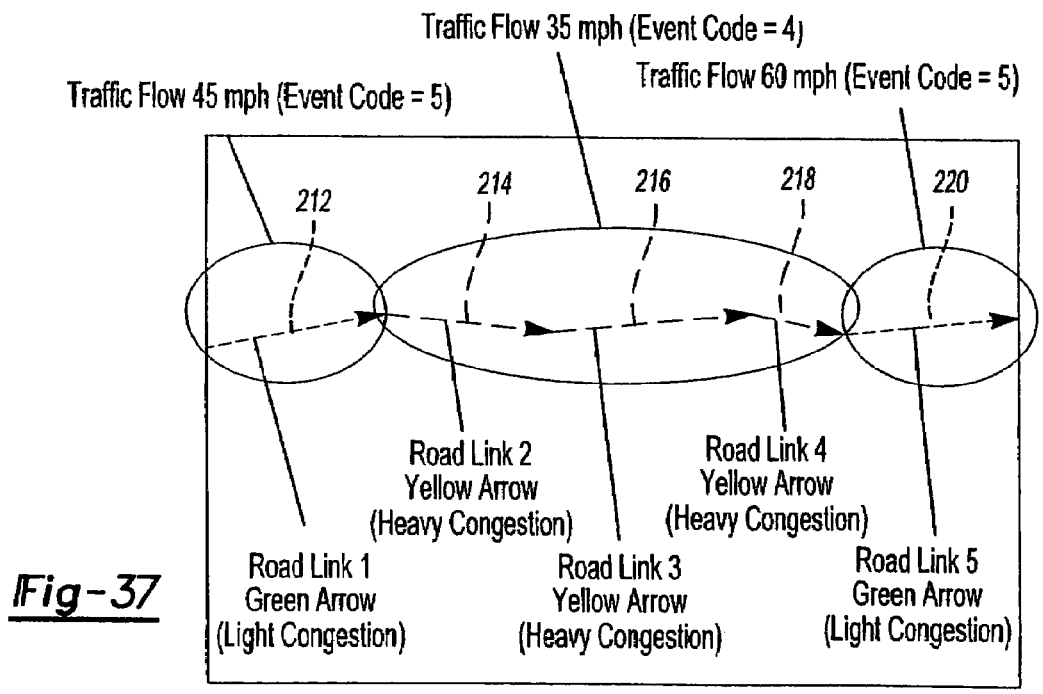

Conversely, FIG. 37 discloses the identical road segments 212–220 under identical traffic flow conditions, but for a Saturday day of the week. In this event, the road segments 212–220 are still depicted as a light traffic congestion traffic flow condition, but the road segments 214–218 are depicted as a heavy congestion traffic flow condition in view of the different speed threshold limits in accordance with the day of the week table illustrated in FIG. 34.

Figure 38:
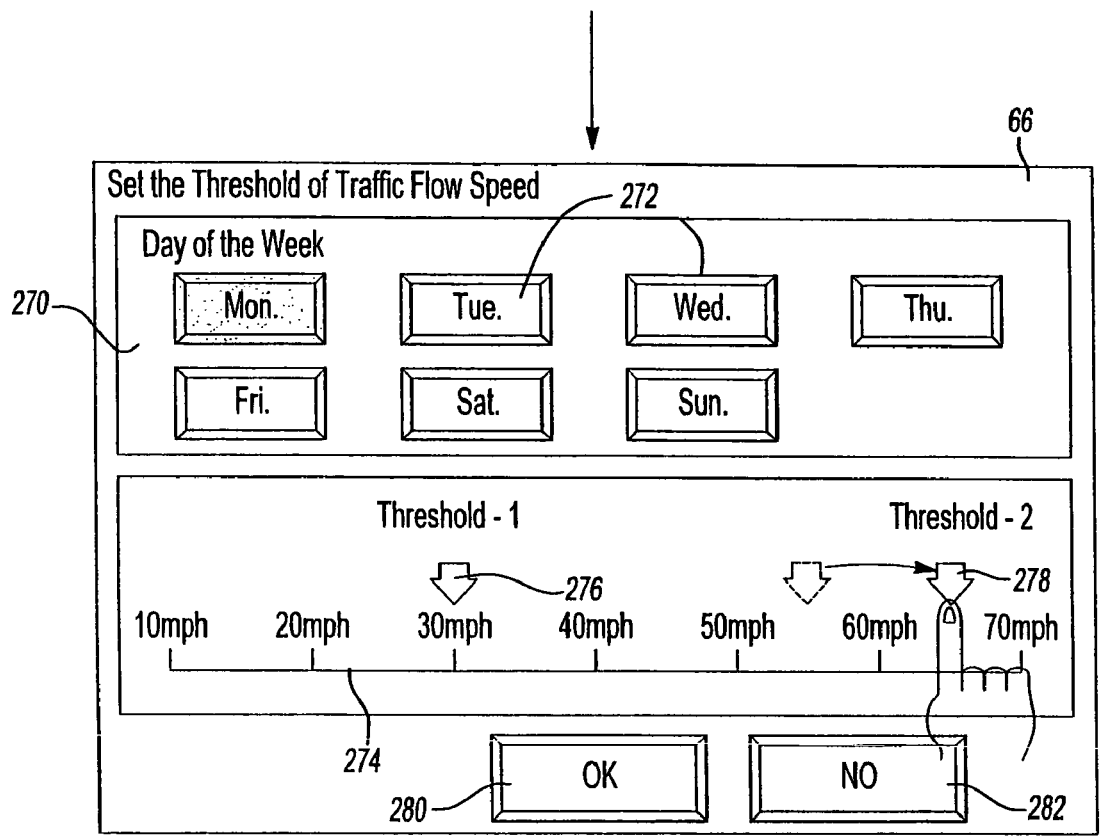
FIG. 38 is an exemplary screen display to modify the speed threshold limits as a function of the day of the week.

With reference now to FIG. 38, the user may customize the speed threshold limits corresponding to the various days of the week through the touch screen 66 for the navigation system. A menu 270 having a plurality of selection buttons 272, each of which corresponds to a different day of the week, are displayed on the screen 66. A speed indicator scale 274 is also displayed on the screen 66 while the two speed threshold limits 276 and 278 are displayed on the screen 66 and cooperate with the threshold limits 276 and 278.

Once the day of the week has been selected by the selection buttons 272, e.g. Monday, the user may then reset either or both of the thresholds 276 and 278 by merely touching the threshold 276 or 278 and moving the selected threshold to a new position along the speed scale 274. For example, as illustrated in FIG. 38, the user can reset the threshold 278 from 55 miles per hour to 65 miles per hour for Monday by merely moving the threshold 278 from the position shown in phantom line and to the position shown in solid line.

After the thresholds 276 and 278 have been set for one or more of the days of the week, the changes may be saved by pressing an OK button 280 on the screen 66 whereupon all of the changes made by the user are saved to the day of the week speed threshold limit table (FIG. 34). Alternatively, all of the changes may be disregarded by the user by pressing the NO button 282.

With the present invention, the actual selection of the various thresholds the user controls on the video display may be selected in several different ways. For example, through a user interface, the user may select which particular criteria, i.e. road type, geographic area, weather conditions, etc., as the proper threshold to use when creating the digital display on the screens. In this case, the user may select and change the criteria used to determine the speed thresholds whenever desired by the user.

Alternatively, the speed thresholds may be automatically altered or offset as a function of the various criteria. For example, assuming an initial speed threshold, that speed threshold may be automatically lowered by a preset amount, e.g., 10 miles per hour, or a preset percentage in the event of a rainy condition. Similarly, the speed threshold would be automatically offset upwardly by a preset amount, e.g., 8 miles per hour, in the event that the day was a weekend day or a holiday. Likewise, the other criteria may be used to automatically adjust or offset the speed threshold limits prior to determining the final speed threshold limit which controls the display on the screen.

In still a third embodiment, the database maintains a matrix in memory representing each permutation of the various factors, e.g., weather, day of the week, road type, etc., and maintain a predetermined, but user modifiable, threshold for each such permutation of the various factors which affect the speed threshold limits.

From the foregoing, it can be seen that the present system provides a novel and unique way of displaying traffic flow information on the screen 66 for the navigation system which may be highly customized by the user to his or her own perception of traffic congestion using any or a number of different factors, such as the day of the week, weather conditions, area of driving, road type and the like. Any of these display criteria may be selected by the user through a GUI. Furthermore, the different speed threshold limits corresponding to the different traffic flow conditions may be individually set by multiple drivers which utilize the same vehicle. In this case, the identity of the driver must be made known to the system. This may be accomplished in any of a number of different fashions.

For example, a driver identification selection screen may be displayed on the navigation system. Each driver selects his or her own identity and, correspondingly, the speed threshold limits as customized by that particular driver. Alternatively, the identity of the driver may be determined automatically, e.g. by means of a signal from a key fob or other means, if desired.

A still further aspect of the method for the navigation and traffic flow condition system of the present invention is the checking of the data to determine not only that the data is not corrupted, but also to eliminate redundant data. Otherwise, the data bus for the vehicle may become overloaded with unnecessary and redundant or corrupted data.

Figure 39:
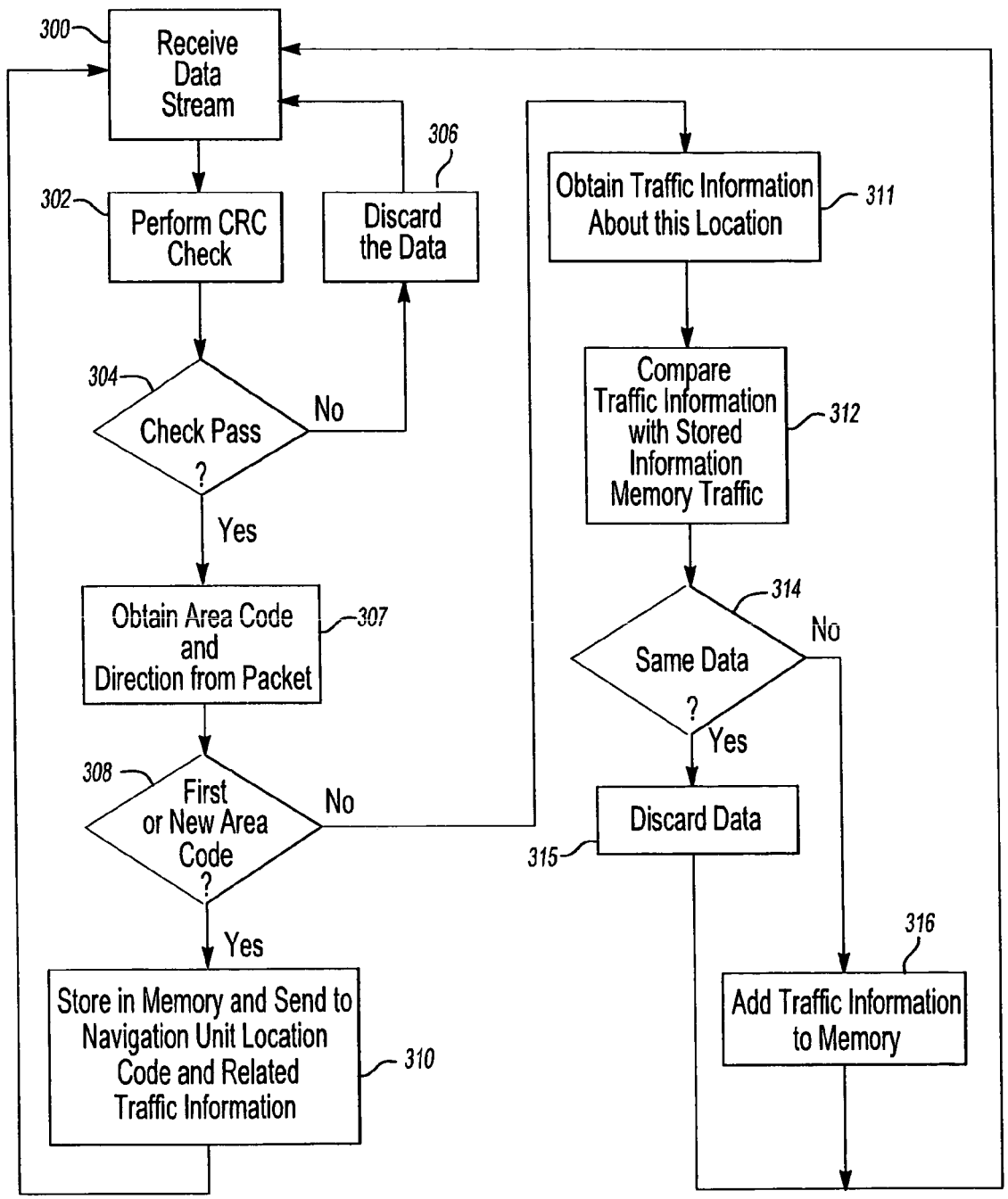
FIG. 39 is a flowchart illustrating an error checking method for received data packets.

With reference then to FIG. 39, a method which prefilters the received data prior to forwarding the data to the navigation system is shown. At step 300 the receiver receives the traffic information data and then proceeds to step 302 which performs a CRC error check on the received data. Step 302 then proceeds to step 304.

Step 304 then determines whether or not the received data is corrupted. If so, step 304 branches to step 306 where the received data is disregarded. Step 306 then proceeds back to step 300 where the above process is repeated.

Conversely, if the data is valid, i.e. not corrupted, step 304 instead proceeds to step 307 where the location code, i.e. the road segment, as well as the direction, is extracted from the received data packet. Step 307 then proceeds to step 308 which determines if the received data is the first data packet received, i.e. the first data packet after initialization of the system or after the vehicle has moved to a new geographic area, e.g. a new county. If so, step 308 proceeds to step 310 where the traffic data is stored in memory. Step 310 then proceeds back to step 300.

Assuming that the system has been previously initialized and that a data packet has been previously stored, step 308 instead branches to step 311 where the system obtains the traffic information for the location of the vehicle. Step 311 then proceeds to step 312 which compares the received data packet with the prior received data packet previously stored in memory. Step 312 then proceeds to step 314 which determines if the currently received data is the same as the previously received data. If so, step 314 branches to step 315 where the currently received data is disregarded and then back to step 300 where the above process is repeated.

Conversely, if the data in the data packet differs from the prior data packet, step 314 instead proceeds to step 316 which stores in memory only the new data received that is different than the previously received data. Step 316 then proceeds back to step 300 where the above process is repeated. In this fashion, redundant data is disregarded thus reducing the processing time required by the system.

From the foregoing, it can be seen that the present method not only checks the incoming data for internal errors and disregards any data that contains such errors, but also continuously compares the received data with the previously restored data packets and only transmits the changed data to the navigation system. As such, the method illustrated in FIG. 39 eliminates the transmission of redundant data to the navigation system.

Figure 40:
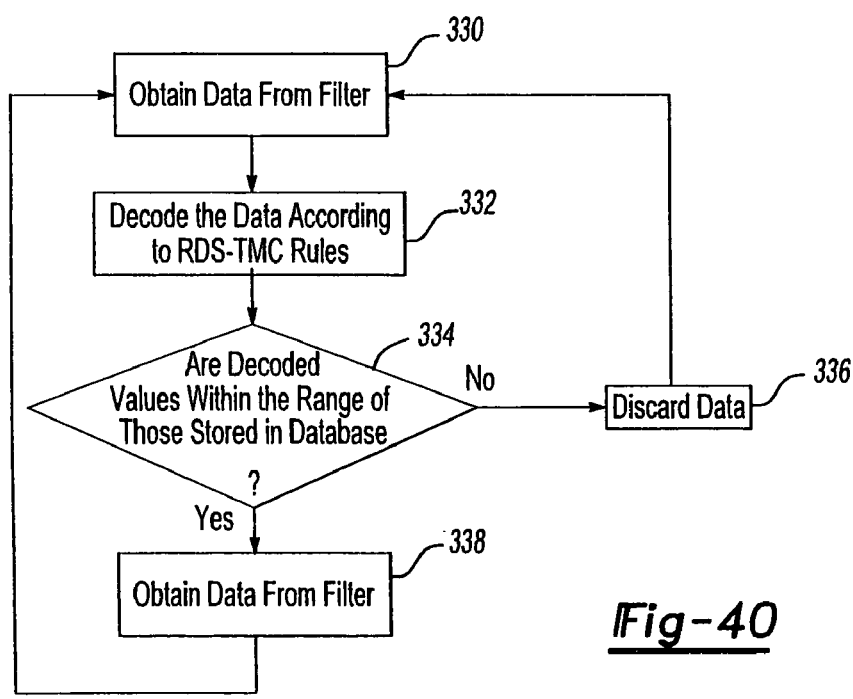
FIG. 40 is a flowchart illustrating a processing method for the data packets.

With reference now to FIG. 40, a flowchart is illustrated which performs a further error check on the received data. The received data follows the standards and conventions set by the appropriate overseeing body, e.g. the RDS-TMC committee. Consequently, under this process, the decoded value of the data contained in the traffic message is compared against this value within the range already stored in the navigation system's database. Such a check will help in identifying whether or not there is an error in the data which might occur if the data fell outside a predetermined range. For example, a traffic flow speed for a particular road segment in excess of 200 miles per hour would clearly be indicative of a data error.

With reference then to FIG. 40, at step 330 the received data, following the error check at step 302 (FIG. 39), is first obtained. Step 330 then proceeds to step 332 which decodes the data according to RDS-TMC rules. Step 332 then proceeds to step 334.

At step 334 the system determines if the decoded values are within the range in the database according to the RDS-TMC rules. If not, step 334 proceeds to step 336 where the data is discarded. Step 336 then proceeds back to step 330 where the above process is repeated.

Conversely, if the data received is within the range according to the RDS-TMC rules, step 334 instead proceeds to step 338 where the received data is passed on to higher levels in the navigation and traffic flow indicator system.

Consequently, as can be seen in FIG. 40, the present invention provides a preliminary data check to ensure data integrity. Only if the data falls within the range set by the RDS-TMC rules will the data be processed by the navigation system.

Consequently, as can be seen from the foregoing, the present invention provides both error checking and redundancy checking to minimize the potential inclusion of incorrect data when used by the system.

From the foregoing, it can be seen that the present invention provides a unique and highly customizable navigation system with traffic flow indicating means which overcomes the disadvantages of the previously known devices. The system, of course, may be used with any type of automotive vehicle, such as trucks, motorcycles, SUVs, and the like. Having described our invention, however, many modifications thereto will become apparent to those skilled in the art to which it pertains without deviation from the spirit of the invention as defined by the scope of the appended claims.

We claim:

1. A method for displaying traffic information in an automotive navigation system having a display, memory and a data receiver comprising the steps of:

storing in a traffic speed table in the memory at least two user definable speed threshold limits, each speed threshold limit representing a different traffic flow category, receiving by the receiver data representative of vehicle speed on at least one road segment, comparing said received vehicle speed data with said traffic speed table to determine the traffic flow category corresponding to said received vehicle speed data for the at least one road segment, and displaying on the display a visual indicator corresponding to the traffic flow category for the at least one road segment.

2. The invention as defined in claim 1 wherein said traffic speed table includes road category data and wherein said comparing step further comprises the step of comparing the received vehicle speed data with the traffic speed table corresponding to the road category data for said at least one road segment.

3. The invention as defined in claim 1 wherein said traffic speed table includes geographic area data and wherein said comparing step further comprises the step of comparing the received vehicle speed data with the traffic speed table corresponding to the geographic area data for said at least one road segment.

4. The invention as defined in claim 1 and further comprising means for preprocessing received data to discard redundant data.

5. The invention as defined in claim 1 and comprising means for error checking received data.

6. The invention as defined in claim 1 wherein said storing means comprises means for storing said speed threshold limits as a function of at least one of the group of road segment type, geographic area, weather conditions, day of the week and road events.

7. The invention as defined in claim 3 wherein the geographic area is user defined.

8. The invention as defined in claim 3 wherein said storing step further comprising the steps of storing the speed of a vehicle in which the navigation system is installed on multiply traveled road segment(s), calculating the average vehicle speed on the multiply traveled road segment(s), and storing speed threshold limits for the multiply traveled road links as a function of the calculated average vehicle speed on the multiply traveled road segment(s).

9. The invention as defined in claim 1 wherein said storing step further comprises the step of setting said speed threshold limits as a function of at least two of the following parameters:
(1) weather conditions;
(2) road type;
(3) geographic area;
(4) traffic event; and
(5) day of the week.

10. The invention as defined in claim 1 wherein said storing step further comprises the step of inputting said speed threshold limits through a graphic user interface.

11. The invention as defined in claim 1 wherein said displaying step further comprises the step of displaying said at least one road segment in a predetermined color corresponding to said traffic flow category, different colors corresponding to different traffic flow categories.

12. The invention as defined in claim 10 wherein said graphic user interface comprises a touch screen.

13. The invention as defined in claim 1 and further comprising the steps of:

determining when the signal strength of the data received by the receiver falls below a predetermined threshold, and displaying a low signal indicator on the display whenever the received data signal strength falls below the predetermined threshold.

14. The invention as defined in claim 13 and further comprising the step of displaying an updating indicator on the display whenever the received data signal strength exceeds the predetermined threshold subsequent to a period when the received data signal strength fell below the predetermined threshold.

15. The invention as defined in claim 1 and further comprising the steps of:

determining when the signal strength of the data received by the receiver is greater than a predetermined threshold, and displaying a receiving signal indicator on the display whenever the received data signal strength is greater than the predetermined threshold.

16. The invention as defined in claim 1 and further comprising the steps of:

inputting a destination, displaying a route on said display between a current position and the destination, said route comprising at least one road segment, and highlighting said route on the display.

17. The invention as defined in claim 16 and further comprising the steps of:

receiving traffic event data, and displaying the traffic event data corresponding to said route on the display.

18. The invention as defined in claim 17 and further comprising the steps of:

assigning a priority value to at least a plurality of different traffic events, determining the received traffic event on said route having the highest priority, and displaying on the display the traffic event having the highest priority.

19. The invention as defined in claim 18 wherein said assigning step comprises the step of assigning the priority values through a user controlled interface.

20. The invention as defined in claim 1 and comprising the steps of:

checking the received data for data redundancy, and disregarding redundant data.

21. The invention as defined in claim 1 and comprising the steps of:

checking the received data for error(s) in the data consistency, and disregarding received data containing error(s).

22. The invention as defined in claim 1 and comprising the step of inputting data representative of weather conditions to a weather threshold table, wherein said comparing step comprises the step of comparing the received vehicle speed data with the traffic speed table corresponding to the weather condition.

23. The invention as defined in claim 21 wherein said resetting step comprises the step of setting speed threshold limits corresponding to different weather conditions through a user controlled interface.

24. The invention as defined in claim 1 and comprising the step of setting the speed threshold limits as a function of the day of the week.

25. The invention as defined in claim 24 wherein said step of setting the speed threshold limits as a function of the day of the week further comprises the step of setting the speed threshold limits through a user controlled interface.

26. The invention as defined in claim 1 and further comprising the steps of storing said speed threshold limits in a central database, and thereafter accessing said central database to retrieve previously stored speed threshold limits for a user.

27. The invention as defined in claim 26 and comprising the step of automatically identifying the user prior to said retrieving step.

28. The invention as defined in claim 1 and further comprising the steps of detecting a system malfunction and notifying the user of the detected malfunction.

29. The invention as defined in claim 28 and comprising the step of transmitting the detected malfunction to a central location.

30. A system for displaying traffic information in an automotive navigation system comprising:
    memory containing at least two user defined speed threshold limits,
    a receiver which receives traffic data representative of vehicle speed on at least one road segment,
    a processor which compares the traffic data with the speed threshold limits contained in memory and generates an output signal as a result of the comparison,
    a display which receives the output signal from the processor and displays visual indicators representative of the actual speed on the at least one road segment relative to said user defined speed threshold limits.

31. The invention as defined in claim 30 wherein said processor is programmed to disregard redundant data received by said receiver.

32. The invention as defined in claim 30 wherein said receiver receives data corresponding to road events on said at least one segment, and wherein said display displays indicia representative of said road events.

33. The invention as defined in claim 30 wherein said display comprises a touch screen and wherein said processor is programmed to enable a user to modify the speed threshold limits through said display using a GUI.

34. The invention as defined in claim 30 and wherein said processor is programmed to check the received data for internal errors.

35. The invention as defined in claim 30 wherein said processor is programmed to store the received data in said memory and to process subsequently received traffic data only if said subsequently received traffic data differs from the stored received data.

36. The invention as defined in claim 35 wherein said processor is programmed to store the subsequently received data in memory only if said subsequently received data differs from the previously received data.

* * * * *